United States Patent [19]
Genung et al.

[11] Patent Number: 5,758,514
[45] Date of Patent: Jun. 2, 1998

[54] GEOTHERMAL HEAT PUMP SYSTEM

[75] Inventors: John Genung, Gallatin; Frank K. Carpenter, Hendersonville, both of Tenn.

[73] Assignee: Envirotherm Heating & Cooling Systems, Inc., Brentwood, Tenn.

[21] Appl. No.: 432,702

[22] Filed: May 2, 1995

[51] Int. Cl.$^6$ .............................. F25B 43/02; F25B 39/04
[52] U.S. Cl. ..................... 62/471; 62/324.4; 62/509
[58] Field of Search .................... 62/509, 324.6, 62/160, 174, 471, 324.4, DIG. 17

[56] References Cited

U.S. PATENT DOCUMENTS

| | | | |
|---|---|---|---|
| 3,307,368 | 3/1967 | Harnish | 62/160 |
| 4,217,765 | 8/1980 | Ecker | 62/503 |
| 4,277,946 | 7/1981 | Bottum | 62/235.1 |
| 4,383,419 | 5/1983 | Bottum | 62/238.6 |
| 4,516,629 | 5/1985 | Bingham | 165/45 |
| 4,583,377 | 4/1986 | Viegas | 62/503 |
| 4,688,717 | 8/1987 | Jungwirth | 237/28 |
| 4,918,931 | 4/1990 | Lowes | 62/509 |
| 5,025,634 | 6/1991 | Dressler | 62/79 |
| 5,062,275 | 11/1991 | Hirata et al. | 62/509 X |
| 5,105,327 | 4/1992 | Wohlforth | 361/56 |
| 5,224,357 | 7/1993 | Galiyano et al. | 62/260 |
| 5,272,879 | 12/1993 | Wiggs | 60/676 |

FOREIGN PATENT DOCUMENTS 35-14191 10/1986 Germany.

OTHER PUBLICATIONS

A Regional Economic Comparison of Ground–Source Heat Pump Systems, Terry Statt, Proceedings of the Workshop on Ground–Source Heat Pumps, IEA Heat Pump Center, Albany, New York, Oct. 1986, p. 65.

Excerpt from marketing memo by Hoosier Energy REC, Dec. 1989.

Heat Pump Suction Accumulators by Refrigeration Research, Inc., Brighton, Michigan, Dec. 1990.

Modern Refrigeration and Air Conditioning, Daniel Althouse, The Goodheart–Willcox Co., Inc., 1982, pp. 693 & 801.

ECR's Direct Expansion Earth–Coupled Heat Pump System, R.W. Cochran, IEA Heat Pump Center Newsletter, vol. 6, No. 2, Jun. 1988, pp. 16–20.

"Neo–geo heat pump," V. Elaine Gilmore, Popular Science, Jun. 1988, pp. 88, 112.

Ground Source Direct Exchange Heat Pump System Installation, Start–up and Service Instrucitons, Dressler Energy Corporation, Olathe, Kansas, 1984.

E–Tech D–Superheater, General Heating & Cooling Co., Kansas City, Missouri.

*Primary Examiner*—William E. Wayner
*Attorney, Agent, or Firm*—Fitzpatrick, Cella, Harper & Scinto

[57] ABSTRACT

A geothermal heating and/or cooling system includes one or more of a plurality of features that enhance the efficiency of the system. Preferably, the system includes a subterranean heat exchanger having tubes disposed against a conductive sheet. The system also preferably includes a reservoir vessel for holding a supply of heat transfer fluid in a liquid phase. Also, the system preferably includes heat exchange means for exchanging heat between the heat transfer fluid and the outdoor air. In addition, the system preferably has an automatically adjusting cooling expansion valve controlled by a sensor disposed to detect the pressure or temperature of heat transfer fluid exiting an indoor air handler in a cooling mode, the system also preferably has an automatically adjusting heating expansion valve controlled by a sensor that is preferably located so as to detect the temperature or pressure of heat transfer fluid flowing from the subterranean heat exchanger to a gas compressor. The enhancements may be used individually or in various combinations.

11 Claims, 12 Drawing Sheets

HEATING MODE

COOLING MODE

GEOTHERMAL HEAT PUMP SYSTEM

FIELD OF THE INVENTION

The present invention relates to heating and cooling systems and, more particularly, to geothermal heating and cooling systems.

BACKGROUND OF THE INVENTION

Due to decreasing supplies of fossil fuels, and the associated increase in the cost of producing energy, much effort has been made to develop more efficient heating and cooling systems. Many new systems have been proposed and/or developed that utilize a source of energy other than oil, natural gas, or electricity produced from burning fossil fuels to operate a heating and cooling system. These other sources of energy include the sun, wind, air temperature, and ground temperature. The use of such alternative sources will lower heating and cooling costs and will decrease the drain on available reserves of fossil fuels. However, widespread use of these alternative sources is unlikely to occur until practical, economical, and efficient systems utilizing these energy sources are developed.

Some of the proposed systems that take advantage of alternative energy sources use a circulating heat transfer fluid to convey thermal energy between the interior of a building and the outdoor air or the ground. To cool the building, heat transfer fluid having a temperature lower than that of the indoor air is circulated. The fluid absorbs thermal energy from the building air and removes it to outdoors. Conversely, to heat the building, heat transfer fluid having a temperature higher than that of the indoor air is circulated. The fluid gives off heat to the indoor air and then picks up additional thermal energy outdoors.

One example of such a system is disclosed in U.S. Pat. No. 5,025,634 to Dressler. That patent discloses a geothermal heating and cooling system that uses a subterranean heat exchanger to allow a heat transfer fluid to absorb thermal energy from the ground or sink thermal energy into the ground in accordance with operation in a heating or cooling mode. The heat transfer fluid is circulated to an indoor dynamic load heat exchanger where thermal energy is exchanged with the indoor air. The load is dynamic since the amount of heating or cooling needed changes over time. A drawback of such a system is that the efficiency with which it operates depends on the efficiency of the thermal energy exchange in the subterranean heat exchanger, which varies depending on soil temperature, moisture, and granularity conditions. Accordingly, the efficiency of such a system may vary greatly, depending on the geographical region and climate in which it is installed. In many regions, the efficiency of such a system will be insufficient to justify using it in place of a heating and cooling system that depends more upon fossil fuel.

The present invention is directed to improving the efficiency of conventional heating and cooling systems that utilize, at least in part, non-fossil fuel energy sources, including increasing the efficiency and stabilizing the efficiency over a wide range of operating conditions.

SUMMARY OF THE INVENTION

An object of the present invention is to provide a more efficient heating and cooling system. A further object of the present invention is to provide a geothermal heating and cooling system having an efficiency that is higher than that of conventional geothermal systems and is more stable over a wide range of soil and climate conditions. Yet another object of the invention is to improve the efficiency of conventional heating and cooling systems by adding components that increase and/or stabilize the efficiency of such systems According to various aspects of the present invention, the above objects are achieved by providing a heating and cooling system having a novel configuration and having novel and/or improved components. The system can be used in its entirety, or certain aspects or components of the system can be used singly or in various combinations to provide a suitable design for specific operating conditions. Further, the individual novel and/or improved components can be used alone or in various combinations to retrofit a conventional heating and cooling system, to improve the efficiency thereof.

Other aspects of the present invention will be apparent to those skilled in the art from the following description of the preferred embodiments read in conjunction with the accompanying drawings.

DESCRIPTION OF THE PREFERRED EMBODIMENTS

The present invention provides an apparatus that may be used for heating and/or cooling. As will be described below, the apparatus can be used, for example, (i) to heat and/or cool room air using a conventional air handler and/or a hydronic system, and (ii) to heat water for household use or other applications requiring hot water.

To perform heating and/or cooling, the present invention uses a geothermal heat pump system having a subterranean heat exchanger. A subterranean heat exchanger can operate more efficiently than a conventional air-to-air heat exchanger because the temperature below ground remains more stable throughout the year than the air temperature.

Geothermal heat pump systems may be of two types: a direct exchange system (sometimes called a direct expansion system) or a water source system. In a direct exchange system, a heat transfer fluid, i.e., a refrigerant fluid, that flows through an indoor portion of the system also flows through an outdoor thermally conductive conduit that is embedded in the ground. Heat transfer occurs between the refrigerant and the soil via the walls of the conduit. The soil therefore acts as a heat sink or a heat source.

Water source installations have a water circulating system that is separate from a refrigerant circulating system. The water circulating system may be either a closed loop system or an open loop system. In the closed loop system, a fluid such as water, ethylene glycol, or the like circulates through a plastic pipe buried in the earth or located underwater, such as in a lake, and passes through a heat exchanger where heat is exchanged with the refrigerant flowing through a separate conduit. In an open loop system, water is taken from a well or other source, such as a river or lake, and is passed through a heat exchanger where heat is exchanged with the refrigerant flowing through a separate conduit. Then the water is dumped in another well or the like, or back in the original water source.

Figure 1:
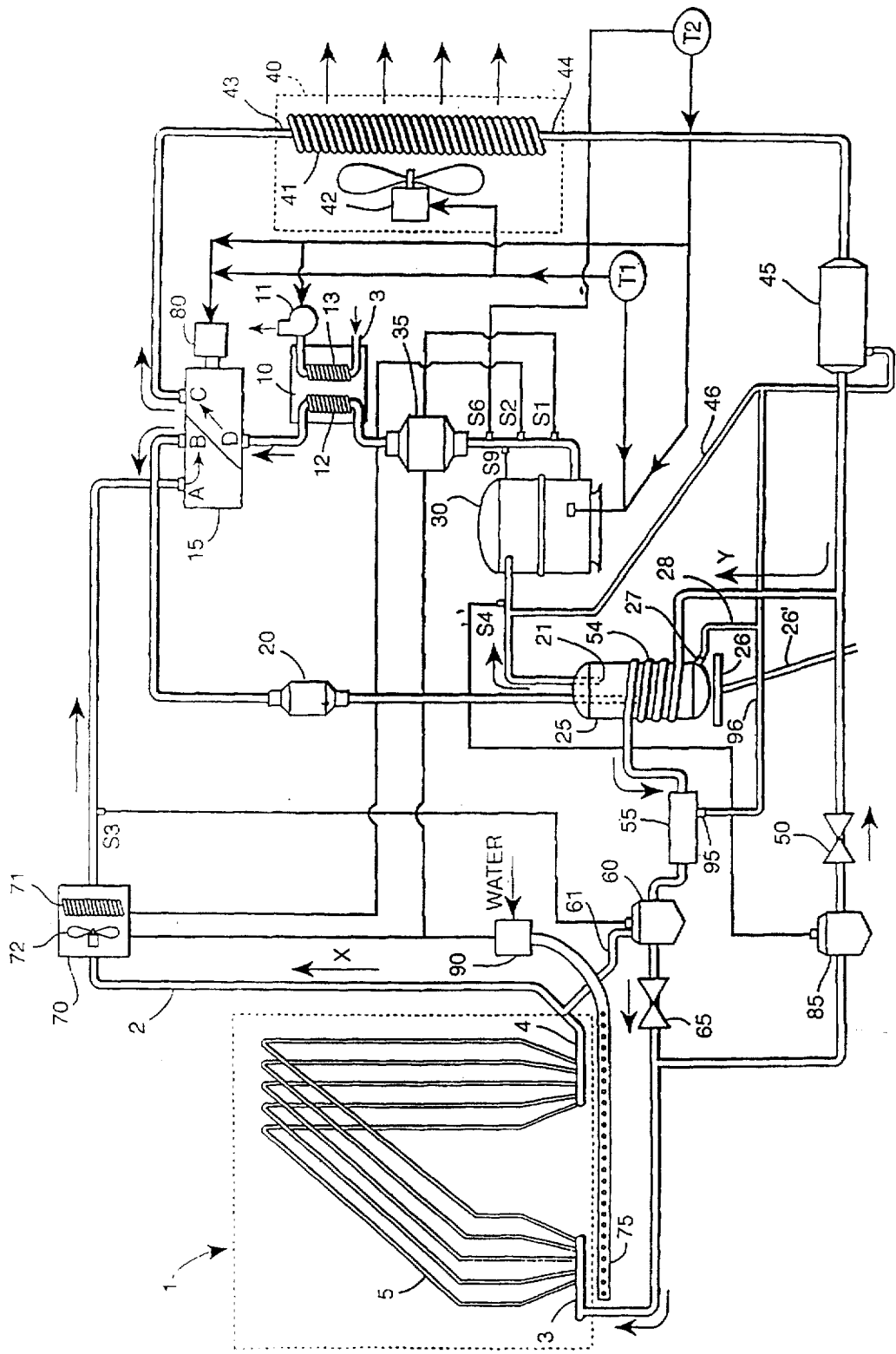
FIG. 1 shows the configuration of a first preferred embodiment of a heating and cooling system according to the present invention when operating in a heating mode.

A preferred embodiment of the present invention is first described with respect to Fig. 1, in which the system is configured in a heating mode.

In the preferred embodiment, a direct exchange system is used. The subterranean heat exchanger 1 has a plurality of buried heat exchange tubes 5 which may be copper, aluminum or the like, serving as the conduit. The tubes are not limited to any particular cross-sectional shape, but merely must permit passage of the refrigerant and must allow heat transfer between the refrigerant and the medium surrounding the tubes. Preferably, the tubes are substantially round, flat, or finned. The tubes can be arranged in various configurations, such as a flat field, a spiral with a vertical axis, a zigzag arrangement of predominantly horizontal stretches disposed in a substantially vertical plane in a trench, or the like. Preferably, all of the tubes 5 should be at least about one-and-one-half feet below the maximum frost or maximum heat line, whichever is lower, and always a minimum of about four feet beneath the surface. In the preferred embodiment, the copper tubes 5 each have a circular cross-section, with an outer diameter of about 0.25 inch and a wall thickness of about 0.032 inch, and they are arranged in a flat field.

The heat exchanger 1 also includes a liquid line distributor (or manifold) 3 and a vapor line distributer (or manifold) 4. In the heating mode, the refrigerant enters the heat exchanger 1 at liquid line distributor 3 and is preferably in a liquid state. The refrigerant preferably is heated to boiling in the heat exchanger 1 and exits in a principally gaseous state. In the cooling mode, however, the refrigerant enters the heat exchanger 1 at distributor 4, preferably in a completely gaseous state. The refrigerant loses heat in the heat exchanger 1 and exits as a cool gas or in a liquid state, or as a gas/liquid mixture.

To the best of our knowledge, in the majority of conventional direct expansion systems, the liquid line distributor and the vapor line distributor are placed in close proximity to one another, typically within a three foot distance. We have found that this results in a problem of short-circuiting the heat exchange advantage achieved in the tubes 5. That is, the change in soil temperature caused by heat exchange with the refrigerant entering the heat exchanger 1 at one distributor adversely affects the heat exchange between the soil and the refrigerant exiting the heat exchanger 1 at the other distributor. Therefore, the liquid line distributor 3 and the vapor line distributor 4 are separated by a minimum distance of ten feet in the preferred embodiment of the present invention, and a divider of insulation such as styrofoam board or rubatex is placed between the two distributors. Ideally, the two distributors should be placed at opposite ends of the field.

Another problem with conventional direct expansion systems is that there is a practical limit on the size of the field, which can prevent optimum efficiency. The field will conventionally have a size of, for example, Five 100-foot-long units of ¼ inch outer diameter (O.D.) copper tubing (a total of 500 feet), arranged in parallel per ton of system capacity, where one ton equals 12,000 BTUs. A conventional system can encounter substantial operating problems if a much greater size field is used, even though a greater field size yields greater performance capacity. The additional refrigerant flowing in the tubes of the larger field can result in an internal system pressure imbalance that, among other problems, prevents switching between the heating and cooling modes. However, one aspect of the present invention involves oversizing the heat exchange tube length in the field by approximately 15 to 25%, preferably about 20%. Accordingly, the present invention ideally uses a field having a total tube length in the range of 550 feet to 650 feet, per ton of capacity. For example, the preferred embodiment of the present invention utilizes five 120-foot lengths of copper tubing per ton of capacity, a total of 600 feet per ton. The tube lengths are adjusted based on soil conditions, with longer tubes being used in soil having poor heat transfer characteristics. If shorter tubes are used, the oversizing can be achieved by adding tubes. The additional copper tubing greatly increases the ground exposure area of the heat exchanger 1, and allows more refrigerant to exchange heat with the ground. This can significantly improve the efficiency of the system. The present invention overcomes pressure imbalance problems, which prevent a conventional system from using a larger field, by using a receiver 55 (discussed below), for example, and therefore can utilize a larger field and operate more efficiently.

Another problem of conventional geothermal heat pump systems is that air gaps may occur between the conduit and the surrounding medium. The air gaps may occur for several reasons. The surrounding soil in a particular region may not have the right texture to make good contact with the conduit, or the soil may have sufficient contact at certain times of the year but not at others, such as when the soil dries out due to arid weather conditions or due to so much heat being transferred from the conduit to the soil during the air cooling mode of operation that it pushes a substantial amount of moisture away from the conduit. Another way that air gaps occur is when a trench or hole is excavated in certain types of soil, such as hard clay. When the hole is backfilled, the excavated soil is not sufficiently pliable to conform itself completely to the conduit.

Figure 3:
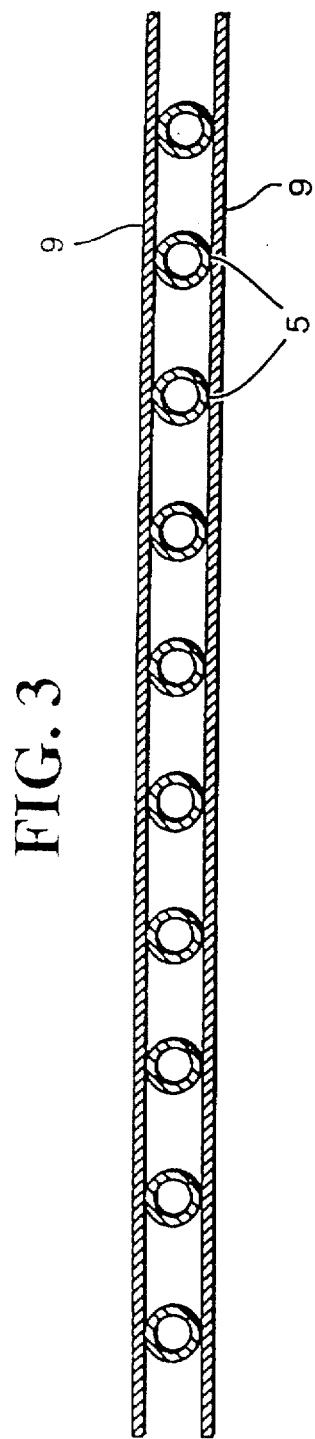
FIG. 3 illustrates a configuration in which a subterranean heat exchanger is sandwiched between metal plates.

One aspect of the present invention, as shown in FIG. 3, involves placing a solid conductive sheet (or sheets) 9, for example a metal plate or piece of sheet metal, above and/or below the copper tubes 5 and in contact with them. This configuration improves efficiency by providing good distribution of heat. A configuration in which copper tubes 5 are sandwiched between two thermally conductive sheets 9, as shown in FIG. 3, is preferable, but a single sheet can be used. The weight of the soil tends to hold the sheet(s) 9 and tubes 5 in direct contact with one another.

Another configuration would be to use a combination of metal plates with another material, such as concrete and/or powdered stone, or the like. A preferred combination would be to place a solid conductive sheet 9 directly adjacent to the excavated soil, place the refrigerant conduit adjacent to the conductive sheet 9, surround the refrigerant conduit with a layer of powdered stone, which might be 2 inches to 12 inches thick, and then place a water soaker conduit 75 above the layer of powdered stone.

In the heating mode configuration shown in FIG. 1, the refrigerant fluid picks up ground heat while flowing through the heat exchanger 1 and exits travelling in the direction of arrow X as a gas (at least predominantly a gas). In the preferred embodiment, the common refrigerant HCFC-22 is used. However, any refrigerant that undergoes a phase change at acceptable temperatures and pressures may be used.

The refrigerant travels in a conduit system (or conduit circuit) that runs throughout the indoor system, which is generally designated as conduit 2. The tubing constituting conduit 2 is preferably copper tubing, but may alternatively be aluminum, copper combined with aluminum, or the like.

Figure 4:
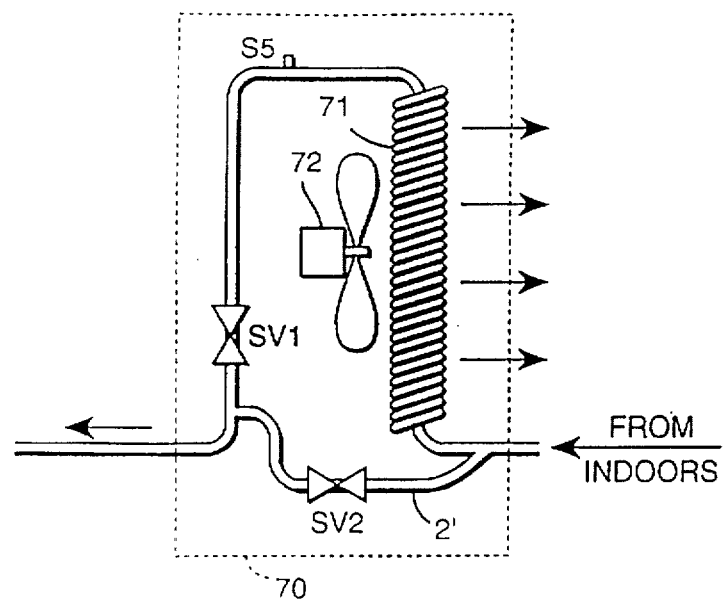
FIG. 4 shows a configuration for an outdoor fan unit that may optionally be used with the present invention.

The system of the present invention preferably is provided with an optional outdoor ambient air heat exchanger 70 through which the refrigerant next passes. The outdoor heat exchanger 70 is comprised of a coil assembly 71, or the like, for facilitating heat exchange through the conduit wall, and a fan 72 for blowing the outside air across the coil assembly 71, as shown in FIG. 4. FIG. 4 shows the flow in the cooling mode, which is reversed in the heating mode. The coil assembly 71 may advantageously be ribbed or finned to maximize the transfer of heat to or from the air. Valves SV1 and SV2 are provided to shunt the gaseous refrigerant around the heat exchanger 70 or conduct it through the heat exchanger, in response to preset conditions, including the pressure of refrigerant passing through the coil assembly 71, as detected by a sensor S5, reaching certain trigger levels. The fan 72 is activated in response to predetermined conditions, for example, when the sensor S2 (shown in FIG. 1) detects that the pressure of refrigerant discharged from the compressor 30 (discussed below) has fallen below about 160 psig, or the sensor S1 (also in FIG. 1) detects that the pressure has risen above about 260 psig. The system is preferably programmed so that fan 72 is not turned on unless it is more efficient to utilize the electricity needed to power the fan than to continue circulating the refrigerant without that assistance. It is important to note that the refrigerant line into which the optional outdoor ambient air heat exchanger 70 is spliced is the line that enters the ground coil when the system is operated in the cooling mode and exits the ground coil when the system is operated in the heating mode.

The preferred embodiment also includes a soaker conduit 75, such as a hose, buried in the ground with the subterranean heat exchanger 1. The soaker conduit is used to add moisture to the soil, which makes the soil surrounding the heat exchanger denser and permits more efficient heat transfer. The use of the soaker conduit 75 will be discussed further below, in the discussion of the cooling mode.

After leaving the outside air heat exchanger 70 in the heating mode, the refrigerant passes along a conduit to a reversing valve 15. In the heating mode, the refrigerant enters the reversing valve 15 at point A and exits at point B. It then passes through a bi-directional suction line filter 20, which serves to filter particulates from the refrigerant. The refrigerant then enters a suction accumulator 25. The suction accumulator 25 functions as a trap vessel to prevent any liquid in the refrigerant stream from reaching the compressor 30 (described below), which is designed to receive gas only and can be damaged by receiving more than a slight amount of liquid. As mentioned, the refrigerant ideally will be in an essentially gaseous state at this point in the system in the heating mode. However, liquid can also be present from time to time if a complete phase change of the refrigerant is not occurring as a result of the passage through subterranean heat exchanger 1 and outside air heat exchanger 70. Any liquid phase refrigerant that falls into accumulator 25 will pool in the bottom. Then, as unsaturated gas flows through at a later point, the pooled liquid refrigerant will evaporate and also pass to the compressor 30 as a gas. Thus, accumulator 25 functions as a trap that takes liquid out of the stream when the gaseous refrigerant is saturated, and allows it to reenter the stream as a gas when conditions change.

In the present invention, waste heat from the compressor 30 is preferably used to heat the suction accumulator 25 and augment the evaporation of any liquid refrigerant that is pooled therein. In the preferred embodiment shown in FIG. 1, a conduit 54 containing gas (compressed refrigerant) exiting the indoor heat exchanger 41 (discussed below) is coiled around the outside lower portion of the suction accumulator 25. The gas, which may be mixed with some liquid phase refrigerant, still is warm enough to heat the contents of the suction accumulator 25. Alternatively, a conduit containing the gas from the indoor heat exchanger can run through the inside of the suction accumulator 25. Also, the suction accumulator can be disposed in close proximity to the compressor 30, preferably directly above it or seated atop it, to receive heat generated by the running of the compressor 30, through radiation or conduction. Further, the suction accumulator 25 of the preferred embodiment is uninsulated. The majority of conventional direct expansion accumulators are wrapped in insulation to prevent troublesome condensation from forming on the outside of the accumulator. We have found, however, that the insulation decreases the efficiency with which any liquid refrigerant trapped in the accumulator can be boiled off. The efficiency is increased by having the accumulator uninsulated and providing a drip pan 26 and drain line 26' to catch any dripping condensation and remove same.

In a conventional direct expansion geothermal system, for example of the type disclosed in U.S. Pat. No. 5,025,634 to Dressler, the accumulator typically is sized so as to be capable of holding approximately 50% of the total system refrigerant charge, i.e., 50% of the volume of refrigerant used in operating the system (assuming the refrigerant is all in the liquid phase). Also, the accumulator typically is covered with a blanket of insulation. One aspect of the present invention is that the accumulator can be downsized to a capacity of only 30% of the total system refrigerant charge. This is possible because the present invention ensures a more complete phase change, so that less refrigerant in liquid state is returned to the accumulator. Further, liquid in the accumulator, which is not enveloped in an insulating blanket, is more quickly boiled off, due to the exposure to compressor waste heat and/or due to the heating of the accumulator via heat left in the refrigerant exiting the interior heat exchanger 41.

Conventional accumulators also collect lubricating oil that is in the gas line coming from the subterranean field. Such accumulators include an orifice or the like at the bottom, to return the oil, through an oil return line, to the compressor. The compressor includes moving parts and therefore requires lubricating oil. Some of this oil typically escapes from the compressor and exits in mist form with the compressed refrigerant gas. In conventional systems the oil travels with the refrigerant through the system and back to the accumulator. The oil is heavier than the liquid refrigerant and pools at the bottom of the accumulator. Since it is necessary to return the oil to the compressor, the accumulator is equipped with a small oil drain line to remove the trapped oil and convey it to the compressor. Gravity and suction cause the oil to flow from the accumulator to the compressor. Liquid refrigerant lying atop the oil may be carried along with the oil, but only in extremely small and harmless amounts. All this is conventional.

The present invention preferably uses an oil separator (described below) to substantially prevent oil from travelling through the subterranean heat exchanger. Therefore, the suction accumulator 25 normally will not contain any oil, and it does not require a mechanism for transferring trapped oil back to the compressor. However, the suction accumulator 25 can be equipped with a downsized oil recovery orifice 27, and an oil return 28, just in case oil does reach the suction accumulator 25, e.g., due to failure of the separator to operate at 100% efficiency. Due to the lesser amount of any accumulated oil in the accumulator 25, our system can use an oil return line 28 having a size of 1/32 inch I.D., as opposed to conventional systems that use varying sizes, all of which are typically larger.

The gaseous refrigerant leaving the suction accumulator 25 enters the compressor 30, which increases the pressure of the refrigerant and provides the driving force for circulating the refrigerant through the conduit system 2. Since the temperature of a given amount of gas is immediately raised if it is compressed into a smaller space, the passage through compressor 30 also increases substantially the temperature of the gas. As it leaves the compressor 30, the refrigerant, although compressed, is still a gas. A sensor S9 provides a safety shut-off mechanism. Sensor S9 outputs a signal to turn off the compressor 30 if the pressure of refrigerant leaving the compressor reaches a preset limit, preferably about 400 psig.

In the preferred embodiment, the compressor 30 is an inertia compressor, but a scroll compressor, reciprocating compressor, rotary compressor, linear compressor, or the like can also be used. Further, the compressor can have a single speed, dual speeds, or a variable speed. When a dual speed or a variable speed compressor is used, it is sometimes preferable to briefly operate the compressor at high speed, e.g., for about five minutes, after it has operated at a low speed for an extended period of time, e.g., approximately one hour. This helps sweep through the lines any lubricating oil that is not caught by the oil separator, rather than allow it to pool and remain in locations away from the compressor. However, since such a compressor normally ramps up to high speed each time it switches on, before dropping to a lower speed sufficient to maintain the system pressure, additional measures for clearing oil from the lines should typically be unnecessary.

Also, in the preferred embodiment a power conditioning shunt may be used with the compressor 30 so that it operates more efficiently. Such a shunt is disclosed, for examples in U.S. Pat. No. 5,105,327 to Wohlforth.

The hot, gaseous refrigerant leaves the compressor 30 and passes through a discharge muffler 35 that reduces noise from the compressor. The refrigerant then passes through a desuperheater 10 that may optionally be included. In the desuperheater 10, heat is transferred from the refrigerant to water circulating through a separate conduit 3. For example, coils 12 formed in the conduit 2 carrying the refrigerant are disposed in close proximity to coils 13 formed in the conduit 3 carrying the water, to permit heat transfer therebetween. The water is circulated by a pump 11, which circulates water, for example from a gas or electrical resistance hot water heater (not shown), through the desuperheater 10, and back to the hot water heater. In this manner, a portion of the caloric energy needed to create a supply of hot water for the building, e.g., for household use, can be obtained from the ground, thereby decreasing the need to burn a fossil fuel or use electrical resistance heating.

Operation of the desuperheater 10 is an auxiliary feature and should not occur if the refrigerant is not hot enough to avoid being liquefied by passage through the desuperheater, or if it is not hot enough to properly perform both the primary heating function and the water heating function. In the preferred embodiment, therefore, the pump 11 is not activated unless the refrigerant temperature exceeds about 120° F. Further, the water should not be overheated, else a user of the water could be scalded. Accordingly, the pump 11 is not activated if the water temperature exceeds 150° F., unless the water is required at a higher temperature, e.g., for an industrial use.

The still-hot gas then enters the reversing valve 15 at point D and exits at point C. The gas then passes through an air handler 40, which includes a heat exchanger 41 and a fan 42. The heat exchanger 41 may be, for example, configured as a coil and preferably has a large amount of surface area. The fan 42 draws cool air through a return duct from a room and blows it across the heat exchanger 41 into distribution conduits (not shown) that circulate the heated air through the building. In the heating mode being described, the hot compressed gas is at a higher temperature than the room air. Heat is transferred from the hot refrigerant through the coil wall to the lower temperature room air. As the refrigerant cools, it may begin to undergo a phase change to a liquid state near the downstream end of the heat exchanger 41. The temperature of the air coming out of the air handler is typically about 93° to 115° F., preferably about 100° F. This is higher than the air temperature of about 85° F. that is periodically achieved by conventional air-to-air type heat pumps, which may feel cool and create unpleasant drafts in a room.

In the heating mode, the refrigerant enters the coil of heat exchanger 41 through a vapor line 43 and exits through a liquid line 44. The vapor line 43 and the liquid line 44 are collectively referred to as the "line set" of the heat exchanger 41. To the best of our knowledge, in the majority of direct expansion geothermal systems, it has been the practice to use the same pair of line sizes, 3/8" O.D. for the liquid line and 7/8" O.D. for the vapor line, for all geothermal heat pump systems having a rated capacity between 2 and 3 tons. Another pair of line sizes, 1/2" for the liquid line and 1 1/8" for the vapor line, has been used for all systems having a rated capacity of 3.5 to 5 tons. However, we have found that system efficiency is decreased if the line set size is not proportionately selected in accordance with the system capacity. For example, with a design such as that described in U.S. Pat. No. 5,025,634 to Dressler, the line sets conventionally have approximately a 65% volume differential between the line set for a 3 ton system and the line set for a 3.5 ton system, whereas the optimum total volume differential between such systems is only about 14%. Further, the same pair of line set sizes is used, for example, in a 2 ton system as is used in a 2.5 ton system, even though such systems have about a 25% volume differential.

One aspect of the present invention addresses this problem by selecting line set sizes between the compressor 30 and the air handler 40 that vary in proportion to the change in system capacity and more closely match the system volume. That is, a ⅝" O.D. liquid line and a ¾" O.D. vapor line are used for a 2–3 ton system, while a ⅜" liquid line and a ⅞" O.D. vapor line are used for a 3.5–5 ton system. These lines are typically made of a copper gauge having a wall thickness of about 0.032".

Figure 6:
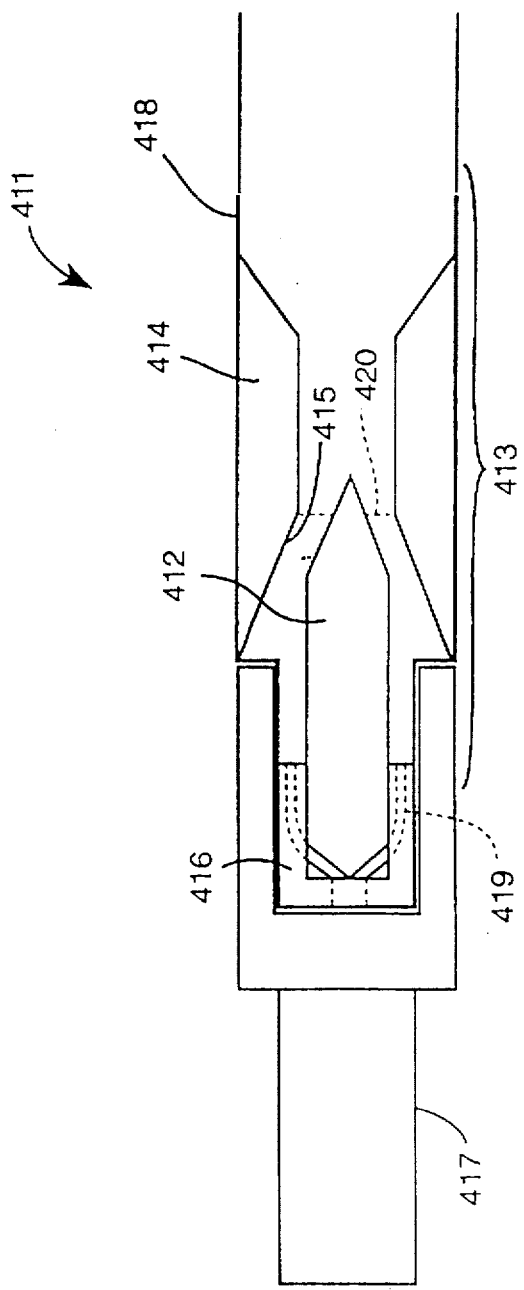
FIG. 6 shows an expansion valve arrangement for an air handler unit.

The coil unit used in an air handler in a geothermal system such as that described in U.S. Pat. No. 5,025,634 to Dressler typically is one that has been manufactured for use as a cooling coil in a conventional air conditioning Installation. As such, it has a restriction device, i.e., an expansion valve, at the entry port, to allow the compressed gas to expand inside the coil and extract heat from the coil wall. As shown in FIG. 6, a restriction device 411, e.g., an adjustable expansion valve, is located in a conduit 418 that is joined to a conduit 417. The restriction device 411 typically includes a bullet-shaped projection 412 that can move axially in the refrigerant conduit. When used as a cooling coil, compressed refrigerant (not shown) flows from conduit 417, past projection 412, into conduit 418, which has a larger internal diameter than conduit 417, causing the gas to expand. When projection 412 is moved all the way to the right, it contacts a retention ring 420 that abuts a valve seat 415. The retention ring 420 has tooled bypass channels that permit some refrigerant to flow therethrough. The projection 412 is prevented from moving further to the right by the retention ring 420, which is in turn held in place by an expansion valve fitting such as the ring-shaped retention housing 414 that is integrally formed in a section 413 of the restriction device 411. In a heating mode, refrigerant flows from conduit 418 to conduit 417, and the flow forces the projection 412 to the left until it contacts an inner flange 416. Bypass channels 419 allow refrigerant to flow around and past the projection 412. It is known in prior geothermal heat pump systems that efficiency can be increased by removing the projection 412 from the refrigerant conduit. To the best of our knowledge, however, the restrictive housing 414 has always been left in the conduit. We have found that the housing 414 can significantly adversely affect the efficiency of the transfer of heat from the hot gas to the air flowing through the air handler 40. One aspect of the present invention, therefore, involves removing the entire section 413 of the restriction device, for example by cutting and splicing, so that there are no restrictions in the line entering the indoor heat exchanger 41. The system efficiency is thereby significantly improved.

The air handler 40 can be replaced by other types of dynamic load heat exchangers. For examples a hydronic heating system can be used. In this type of system, a water conduit is embedded in the floor of a room, for example, and the hot refrigerant passes heat to water circulating through the conduit. Further, a combination of a forced-air system like air handler 40 and a hydronic system can be used.

The warm (but no longer hot) refrigerant next passes through an oil separator 45 for removing suspended oil droplets. At this stage of the heating mode the refrigerant is primarily gaseous. The oil separator 45 has a baffle assembly (not shown) that allows the oil droplets, which are heavier than the refrigerant, to fall to the bottom of the oil separator 45. Commercially available oil separators have an internal spiral configuration. As the gaseous refrigerant, which is under pressure, flows through the oil separator 45, centrifugal force causes the oil droplets to be thrown to the wall of the oil separator. The pressurized refrigerant flows on through the oil separator 45, while the oil pools at the bottom. An oil return line 46 is provided to return the pooled oil to the compressor. This line may feed directly into the compressor or into the gas intake conduit leading to the compressor. The oil is made to flow through line 46 by static pressure differences within the system. Any liquid refrigerant that is present in the gas entering the oil separator is in a very small quantity. This liquid refrigerant may also flow through the oil return line 46, but is an insufficient amount to damage the compressor 30.

After passing through the oil separator 45, the gaseous refrigerant is blocked by a one-direction check valve 50 and forced in the direction of arrow Y. The refrigerant then passes in direct proximity to the accumulator 25, so as to assist in boiling any excess liquid refrigerant in the bottom of the accumulator, so that it changes to a gaseous state before entering the compressor 30. The refrigerant (now somewhat cooler) then passes through a receiver 55, which is a reservoir vessel for storing excess liquefied refrigerant not needed for circulation in the system. The receiver 55 of the present embodiment has a fixed capacity. Any mist-like droplets of refrigerant that are present in the gas stream at this point tend to fall out of the stream and collect in the receiver, which is a trap-like vessel. Conventional geothermal heat pump systems suffer a drawback because the temperature of the subterranean heat exchanger 1 may vary seasonally, which changes the amount of refrigerant required to efficiently charge the system. This is problematic because refrigerant must either be manually added to or removed from the system as seasons change, or a median charge must be injected which is not the optimum charge For all seasons.

The receiver 55 in the preferred embodiment of the present invention provides a place for excess refrigerant to accumulate in liquid form and stay out of circulation until needed. The demand for refrigerant generally is greatest when the system operates in the cooling mode. As the demand increases in the system, the vapor pressure above the liquefied refrigerant in the receiver 55 drops, allowing some of the liquid to evaporate and supply the demand. The receiver 55 also prevents damage or incorrect operation if an installer slightly overcharges the system. Concerns about charging accuracy are therefore significantly reduced. The receiver is preferably of a size to hold a predetermined amount of liquid refrigerant, based on the difference in the amount of refrigerant required for heating and cooling modes of operation. For example, it may be sized to hold up to approximately 30% of the system charge, when all of the refrigerant is in the liquid phase. Receivers available on the market are typically size specific and do not provide superior results. An improved receiver structure is discussed below with respect to another preferred embodiment.

After exiting the receiver 55, the gaseous refrigerant passes through a pressure-regulating heating valve 60, which functions as an expansion valve for expanding the refrigerant. A conventional direct exchange system typically uses a manually adjusted heating valve that controls the volume of refrigerant flowing past that point, in order to regulate the pressure immediately downstream of the valve. Normally heating valve 60 restricts the flow from the gaseous refrigerant, causing the discharge side pressure to be less. Such a valve is opened or closed by, for example, turning a set screw, and it can be set to achieve, on average, an optimal downstream pressure. However, the truly optimal pressure may change from time to time, due, for example, to seasonal temperature differences. Therefore, the conventional direct exchange system suffers a drawback in that, if it is to be operated in the most efficient manner, its heating valve must be repeatedly manually adjusted throughout the year. In addition, a conventional direct exchange system uses an internal bleed port, e.g., a small throughhole in the valve, to slowly equalize the pressure on both sides of the valve after the system is shut down, so that the system can be more easily restarted later. However, this arrangement suffers another drawback, in that the bleed port may inhibit system operational efficiencies or become stopped up and fail to function properly. The present invention overcomes the latter drawback by using a bypass line 61, external to the valve, to equalize pressures. The by-pass line 61 is a small tube that comes out of the heating valve 60 and connects to the conduit 2 at a point where the line pressure is lower than at the heating valve 60, such as on the opposite side of the subterranean heat exchanger 1. This arrangement is not subject to becoming stopped up, as is the conventional internal bleed part. The by-pass line 61 preferably has an outer diameter of about 1/8" to about 1/4".

The present invention overcomes the drawback of needing to repeatedly manually adjust the heating valve. It does so by using an automatically adjusting temperature and pressure sensitive valve, instead of a fixed-point, manually adjusted valve, as heating valve 60, in combination with one or more sensors at particular locations in the system. The preferred location is in or on the line exiting the ground coil (heating mode). A sensor S3, such as an expansion bulb, detects the pressure or temperature of the refrigerant gas coming into the building from the heat exchanger 1. The sensor S3 may be located, for example, just inside the building or outside the building closer to the distributor 4. The heating valve 60, via capillary action, automatically adjusts the size of the opening through which the refrigerant flows, based upon that pressure or temperature. If the line temperature or the line pressure at sensor S3 is relatively low, the downstream (discharge side) pressure at valve 60 is increased by allowing more refrigerant to flow through the valve, and vice versa. The sensor S3 is calibrated to hold the discharge side pressure within a preferred range. This arrangement provides accurate control of the system pressure and helps maintain maximum efficiency. The conventional fixed point manually adjusted valve, such as that used in the system described in U.S. Pat. No. 5,025,634 to Dressler, must be frequently manually adjusted using a set screw or the like, to hold the discharge side pressure within a preferred range. Any one setting will not permit optimal performance during all weather or seasonal conditions.

The refrigerant, now at its coolest temperature, next flows through check valve 65 back into subterranean heat exchanger 1.

A thermostat T1 is provided to indicate when the indoor air requires heating. In response to a signal from thermostat T1, the compressor 30 and fan 42 are both turned on. In addition, an actuator 80 is operated to place the reversing valve 15 in the proper configuration for the heating mode, as opposed to the cooling mode. The actuator 80 can be an electromagnetic device, for example.

Figure 2:
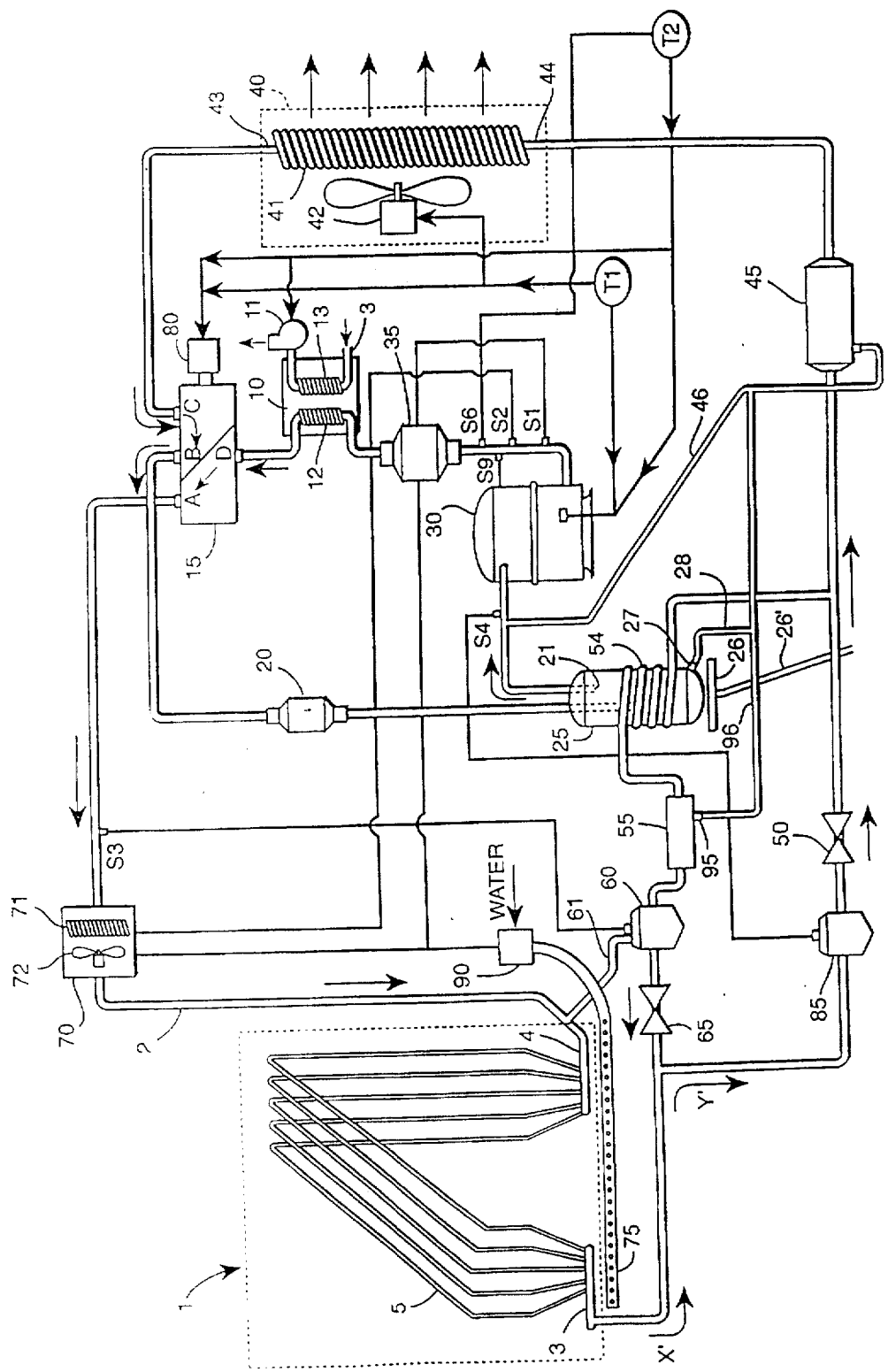
FIG. 2 shows the configuration of a first preferred embodiment of a heating and cooling system according to the present invention when operating in a cooling mode.

The preferred embodiment is next described with respect to FIG. 2, in which the system is configured to operate in a cooling mode.

The refrigerant leaves the subterranean heat exchanger 1 in the direction of arrow X' in a primarily gaseous state, but possibly with some liquefied refrigerant present as well.

The refrigerant is blocked by check valve 65 and is forced alone a conduit in the direction of arrow Y' to a pressure-regulating cooling valve 85. The flow of the refrigerant is controlled by the cooling valve 85 so that the pressure on the downstream side of the valve is lower than that on the upstream side. The pressure differential causes the temperature of the refrigerant to decrease as it passes through the cooling valve 85. The valve is adjustable to set the size of the port through which the refrigerant flows at least several different positions. If desired, it can be infinitely adjustable between fully open and minimally open. The size of the port opening is controlled based on a signal from a sensor S4, which detects the pressure or temperature of the refrigerant entering the compressor 30. If the temperature climbs above a predetermined set point, the size of the throughport opening in cooling valve 85 is reduced, thereby decreasing the flow of refrigerant and lowering the downstream pressure and temperature of the refrigerant. This creates a larger temperature differential between the refrigerant and the indoor air temperature when the refrigerant passes through the air handler 40.

Conventional direct expansion geothermal heat pump systems typically use a sensor disposed between the indoor heat exchanger (the air handler) and the reversing valve for controlling the cooling valve. The sensor is usually located adjacent to the reversing valve. Since the reversing valve is normally disposed in a cabinet containing the compressor and the accumulator as well, the sensor is normally located in that cabinet also. We have found, however, that this arrangement only provides a general indication of the refrigerant temperature at critical points in the system. What is better to use for system control is the temperature of the refrigerant as it enters the compressor, because the temperature will change as the refrigerant travels through the reversing valve, the system conduit, and the accumulator. One embodiment of the present invention provides more precise control of refrigerant flow, and therefore the means for achieving higher operating efficiencies, by placing the sensor S4 at a location that provides the most accurate detection of the refrigerant temperature at the compressor 30. In the presently-described preferred embodiment, the sensor S4 is positioned as shown in FIGS. 1 and 2, i.e., between the suction accumulator 25 and the compressor 30. However, it could alternatively be placed in or on the line between the suction filter 20 and the suction accumulator 25, immediately before the suction accumulator 25. Still better efficiency is obtained by removing the sensor S4 from the compressor cabinet, or its vicinity entirely, and placing the sensor S4 at or near the point where refrigerant exits the air handler 40 in the cooling mode.

The refrigerant leaving the cooling valve 85 passes through the check valve 50 and flows to the oil separator 45. There is less likely to be oil in the refrigerant when the system is operated in the cooling mode, because of the high pressure and temperatures experienced in the system in that mode. If, however, there are any oil droplets entrained in the refrigerant, they will be removed by the oil separator 45, or they will pool in the bottom of the accumulator 25 and will be carried back to the compressor 30 by the accumulator oil drain line 28. If too much refrigerant flows through the cooling valve 85 to the oil separator 45, some of the refrigerant will flow into the side conduit indicated by flow direction arrow Y in FIG. 1, and possibly add to the contents of receiver 55. However, once the pressure in the side conduit is equalized with that in the main conduit, flow to the receiver 55 will cease. If the refrigerant reaching receiver 55 contains any oil, some or all of that oil may settle to the bottom of the receiver 55. Therefore, the preferred embodiment of the present invention includes a bleed port 95 and an oil line 96 to return oil from the receiver 55 to the compressor 30. The oil line may lead, for example, directly to the compressor 30, or, as shown in FIGS. 1 and 2, the oil line, identified as 96, may tie in to the oil return line 46. Also, and not shown, the oil line may alternatively run to the oil separator 45. The size of the bleed port 95 should be small enough that any liquid refrigerant escaping the receiver 55 through the bleed port 95 will be of such a small amount as to be insignificant. Since lubricating oil is heavier than liquid refrigerant, the lubricating oil will tend to pool below the refrigerant and be preferentially drained through bleed port 95.

By the time the refrigerant reaches the entry port to the heat exchanger 41 of air handler 40, most of it is in the liquid phase.

The cooled refrigerant then passes through the heat exchanger 41 of the air handler 40. As the fan 42 blows higher temperature room air across the coils of the heat exchanger 41, heat is transferred from the room air to the refrigerant. Condensate will typically form on the exterior surface of the heat exchanger 41, fall into a drip pan and be drained or pumped, via a standard condensate pump (not shown), into the underground soaker conduit 75. The room air is cooled and the refrigerant is warmed, e.g., to a temperature near which it will be mostly in the gas phase. The refrigerant then enters the reversing valve 15 at point C and exits at point B. It passes through the suction line filter 20, which filters out particulate debris, including any ice crystals that might be present, and then goes to the suction accumulator 25. The refrigerant should be mostly in a gaseous state, but any liquid will be caught in the suction accumulator 25.

The gaseous refrigerant then enters the compressor 30 and is re-pressurized. The warm compressed gas then flows through discharge muffler 35 to the desuperheater 10. The refrigerant reaching the desuperheater 10 usually should be warm enough (greater than about 125° F. in the preferred embodiment) to trigger activation of pump 11, if water heating is needed. The temperature of the refrigerant is typically lowered in the desuperheater, then the refrigerant enters reversing valve 15 at point D, exits at point A, and enters the outdoor heat exchanger 70.

When the outdoor air temperature is cooler than the temperature of the refrigerant leaving subterranean heat exchanger 1, the outdoor ambient air heat exchanger 70 can be used to enhance performance by removing heat from the refrigerant prior to its entering the ground coil of the heat exchanger 1. This is particularly beneficial for decreasing the load on the heat exchanger 1 in the later part of the cooling season, when the ground has absorbed a great deal of heat. In the preferred embodiment, a sensor S1 is provided to detect the refrigerant pressure after it exits the compressor 30. The outdoor fan 71 is preferably operated if the pressure climbs too high, e.g., above about 250 psig, to maintain the compressed gas pressure in a general range of about 200 to 250 psig. For example, if sensor S1 determines that the discharge pressure from the compressor is at 255 psig, say, then the refrigerant is passed through the air heat exchanger 70, as opposed to bypassing it. The refrigerant is then cooled when the fan 72 draws ambient air across the coil assembly 71. This action helps prevent the ground coils of the subterranean heat exchanger 1 from overheating and driving away moisture from the area of the tubes 5, which would reduce or prevent the heat exchange necessary for the condensation of the refrigerant. This process also prevents baking of the soil adjacent to the tubes 5, which would result in formation of an insulator around the tubes 5. An outdoor condenser having a size that is only about two-thirds of that normally required for a conventional air conditioner for the particular system demand can increase the efficiency of the present system by about 30%, more or less, in the cooling mode. It is important that the air heat exchanger 70 be placed on the side of the ground heat exchanger 1 where the hot refrigerant is entering the ground to be cooled, so that any excessive heat can be removed prior to entry into the ground, provided the air temperature is low enough.

The subterranean soaker conduit 75 can also be used to control the system pressure. When the ground has absorbed a great quantity of heat, the soil around the heat exchanger 1 may dry out. This can create dead air spaces that decrease the heat transfer efficiency. As a result, the temperature of the refrigerant may rise, resulting in a corresponding pressure increase, which reduces the system's efficiency. By adding moisture from an external water source to the soil through the soaker conduit 75, the heat transfer efficiency can be improved and the system pressure lowered. Manual control of water to the soaker conduit 75 has been tried in conventional direct expansion systems but is inconvenient. Also, condensate forming on the air handler 40 in the cooling mode should be routed to the soaker conduit, through a drip pan and a hose, for example, but the amount of condensate will likely be insufficient, by itself, to adequately moisten the soil around the heat exchanger 1.

The present invention provides a solution that efficiently uses the soaker conduit 75 to lower the system pressure. The soaker conduit 75 is connected to a water source such as a faucet, for example, through an on/off water valve 90. The refrigerant pressure detected by the sensor S1 is used to control the on/off state of the water valve 90. In the preferred embodiment, the water valve 90 is generally turned on when, in the cooling mode, the refrigerant pressure out of the compressor 30 exceeds 250 psig, and is turned off when the pressure falls below 200 psig.

The control of the system in the cooling mode is similar to that in the heating mode. Thermostat T1 outputs a signal when air cooling is required. In response, the compressor 30 and the fan 42 are activated and the actuator 80 places the reversing valve 15 in a state suitable for the cooling mode.

Yet another mode of operating the system is possible, in which water heating is provided even when no air heating or cooling is taking place, because it is unnecessary. A thermostat T2 outputs a signal when water heating is required. The signal causes activation of the compressor 30 and the pump 11, and causes the actuator 80 to place the reversing valve 15 in the heating mode state. However, the air handler fan 42 remains off since the thermostat T1 does not output a signal. Very little heat transfer will occur between the hot refrigerant and the room air as the refrigerant flows through the indoor heat exchanger 41 in the direction shown in FIG. 1, but the compressor will heat the refrigerant and at least some of that heat will be transferred to the water circulating through the desuperheater 10.

The compressor 30 will operate for a duration of, say, about 45 minutes, or until either the hot water demand is met (as indicated by thermostat T2) or a pressure of 250 psig is reached. The pressure is detected by a sensor S6 located near sensor S2 to measure the pressure of the refrigerant leaving the compressor 30. If a pressure of 250 psig is reached, a cycle lock-out control is engaged to rest and/or cool the compressor 30, e.g., for about 15 minutes or so. The pump 11 continues to run even when the compressor 30 is locked out, so that heat remaining in the desuperheater 10 is transferred to the water. The compressor is reengaged after the lock-out period ends, if there is still a demand for water heating.

Figure 5:
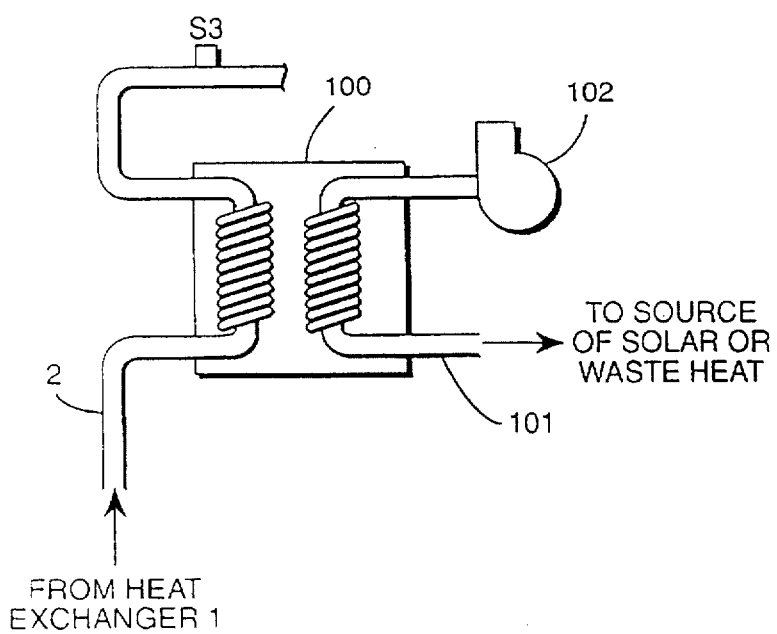
FIG. 5 shows a configuration for a desuperheater that may be used with the present invention to heat water

Another embodiment of the present invention is described with respect to FIG. 5, which shows a relevant portion of the system. In this embodiment, heat from an alternative source such as solar energy from an outdoor solar collector or attic solar collector or recovered waste energy, e.g., waste heat from a furnace, water heater, flue gasses, industrial waste water, or the like, is used to help heat the refrigerant. A supplemental heat exchanger 100 is provided between the point where the refrigerant exits the heat exchanger 1 in the heating mode and the sensor S3. A medium such as water, ethylene glycol, or the like is circulated through a separate conduit 101 by a pump 102. The conduit 101 is arranged so that the circulating medium is heated by a source other than the ground or ambient air, for example, solar or waste heat, and transfers that heat to the refrigerant in the supplemental heat exchanger 100.

Figure 7:
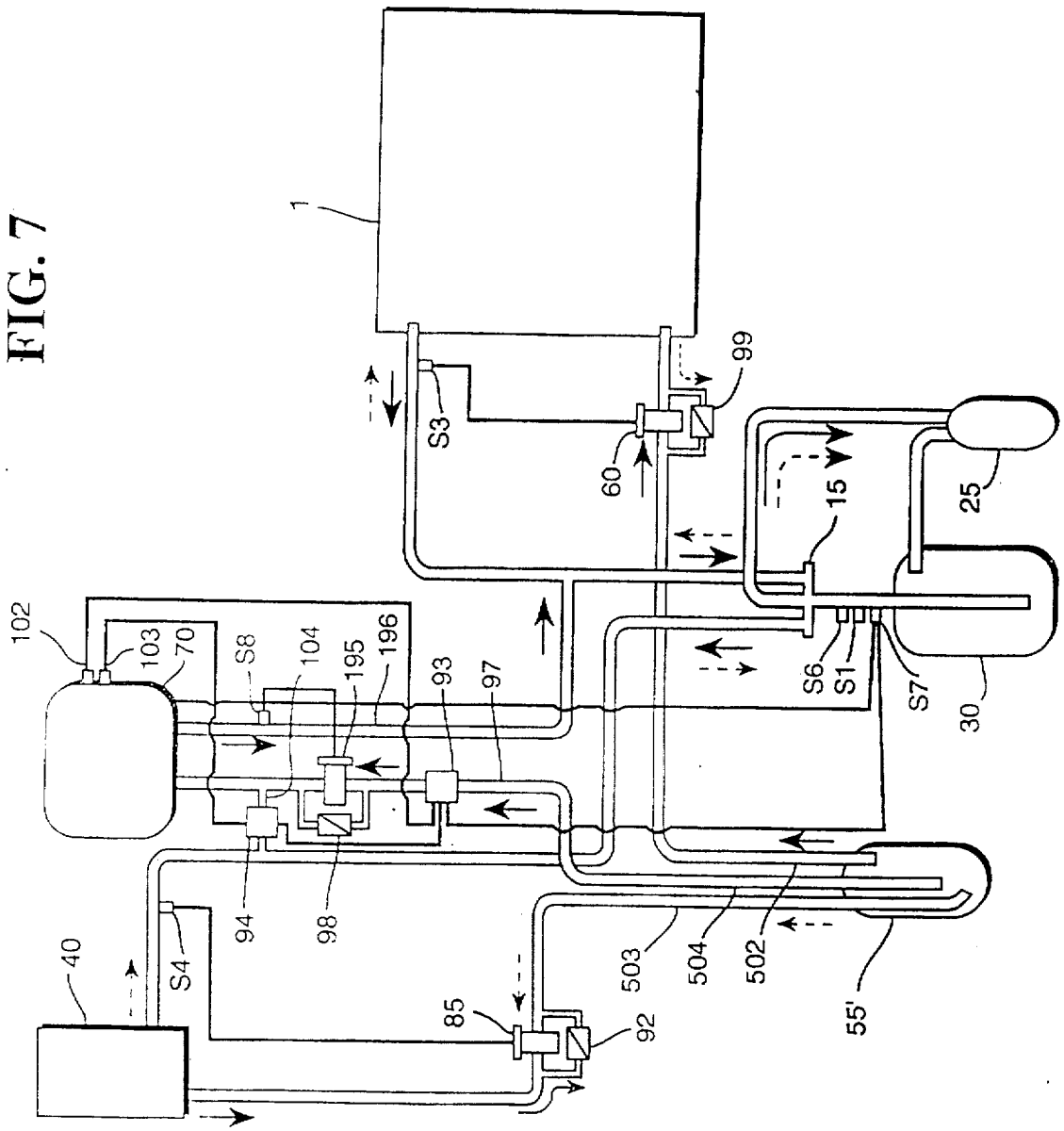
FIG. 7 shows the general configuration of an alternative arrangement for an outdoor fan unit in a heating and cooling system according to the present invention.

FIG. 7 shows the general configuration of another preferred embodiment of the present invention. Components that perform the same function as components in FIG. 1 are given like reference numerals in FIG. 7. The direction of refrigerant flow in the heating mode is indicated by solid arrows, and the direction of refrigerant flow in the cooling mode is indicated by dashed arrows.

In this embodiment, refrigerant leaves the subterranean heat exchanger 1 in the heating mode and travels to the reversing valve 15. The refrigerant is routed through the reversing valve 15 so that it passes to the accumulator 25 and then into the compressor 30. Solenoid valve 94 is normally closed, so the hot refrigerant exiting the compressor passes through air handler 40. The refrigerant then passes through check valve 92, bypassing expansion valve 85, and into the receiver 55'. A small amount of refrigerant may pass through expansion valve 85, but it will not adversely affect the system operation in any significant manner. The path through check valve 92 offers less resistance than the path through expansion valve 85, so most of the pressurized refrigerant will flow through the check valve 92. Solenoid valve 93 is normally closed, so the refrigerant exits the receiver 55' in the direction of expansion valve 60. A check valve 99 forces the refrigerant to flow through the expansion valve 60.

The refrigerant is cooled as it passes through the expansion valve 60 and then goes back into the subterranean heat exchanger 1.

The direction of flow is reversed in the cooling mode. The refrigerant exits the subterranean heat exchanger 1 and most of it flows through the check valve 99, bypassing expansion valve 60. Then, the refrigerant flows through the receiver 55', through the expansion valve 85, and through the air handler 40.

The refrigerant then passes through the reversing valve 15 into the accumulator 25, through the compressor 30, back through the reversing valve 15, and back into the subterranean heat exchanger 1.

Next, the operation of the performance enhancing outdoor fan 70 is described. In the heating mode, the performance enhancing fan is used to augment the heating ability of the subterranean heat exchanger 1, which is subject to ground coil temperature fluctuations. When the sensor S7 detects that the pressure of refrigerant at the discharge side of the compressor 30 falls below a preset level, e.g., about 160 psig, the solenoid valve 93 opens. Further, the sensor S7 also controls the outdoor fan 70 to turn on when solenoid valve 93 is open. A portion of the refrigerant in the receiver 55' then flows through the conduit section 97 and through the expansion valve 195. The expansion valve 195 is controlled by a sensor S8, such as an expansion bulb, disposed to sense the pressure or temperature of the refrigerant flowing in a conduit section 196. The expanded refrigerant flows through the outdoor fan 70. The outdoor fan 70 is activated when the solenoid valve 93 is open if an airflow sensor 102 senses adequate airflow and an outdoor coil temperature sensor 103 detects a coil temperature in an appropriate predetermined range. The refrigerant is heated as it passes through the outdoor fan, and it then passes back into the main system through conduit section 196.

When the airflow sensor 102 senses inadequate airflow or the outdoor coil temperature sensor 103 senses a coil temperature less than 35 degrees F., it is taken as an indication that a defrost cycle is necessary to defrost ice formed on the outside of the coil of the outdoor fan 70. The solenoid valve 93 is closed, the solenoid valve 94 is opened, and the outdoor fan 70 is deactivated. When the solenoid valve 94 opens, a portion of the hot refrigerant flowing from the discharge side of the compressor 30 flows through a conduit section 104 and through the outdoor fan 70.

The hot refrigerant serves to defrost the coil. When the coil temperature rises above 65 degrees F., the defrost cycle is terminated and the outdoor fan 70 resumes normal operation. The defrost cycle is also terminated if the heating requirements indicated by an indoor thermostat are satisfied. When the cycle is terminated, the system resets the solenoid valves 93 and 94 to their normal positions.

The operation of the outdoor fan 70 in the cooling mode is now described. In the cooling mode, the outdoor fan 70 helps relieve high head pressures that may occur when the subterranean heat exchanger 1 is not serving as an adequate heat sink. The problem can be particularly troublesome in the swing seasons, e.g., early spring and late fall. In early spring, for example, the system may operate in the heating mode in the cool morning, and take heat out of the ground. In the afternoon, however, as the outdoor air temperature rises the system must be switched to the cooling mode. Under these circumstances, the subterranean heat exchanger 1 may act like an oversized condenser, and may fail to adequately condense the refrigerant.

If sensor S7 senses that the pressure of refrigerant discharged by the compressor 30 increases above a predetermined level, say about 260 psig, then the solenoid valve 93 is opened. Two separate sensors can be used in place of sensor S7. For example, a combination of a sensor that opens solenoid valve 93 when the pressure has fallen below about 160 psig and a sensor that opens solenoid valve 93 when the pressure has risen above about 260 psig can be used. When the solenoid valve 93 is open, a portion of the refrigerant exiting the compressor 30 will be routed through the conduit section 196 to the outdoor fan 70. The outdoor fan 70 cools the refrigerant using air as a heat exchange media in lieu of the ground. The refrigerant passes through a check valve 98 to bypass the expansion valve 195 and flows into the receiver 55'. This configuration is especially advantageous at the time of starting up the system when switching from the heating mode to the cooling mode. During the heating mode, refrigerant will collect in the receiver 55'. When the system is switched to the cooling mode, the solenoid valve 93 will open and a portion of the hot refrigerant from the compressor will be routed through the outdoor fan 70 to the receiver 55'. The hot refrigerant will help boil off the liquid refrigerant stored in the receiver 55', so that the amount of circulating refrigerant increases.

Figure 9:
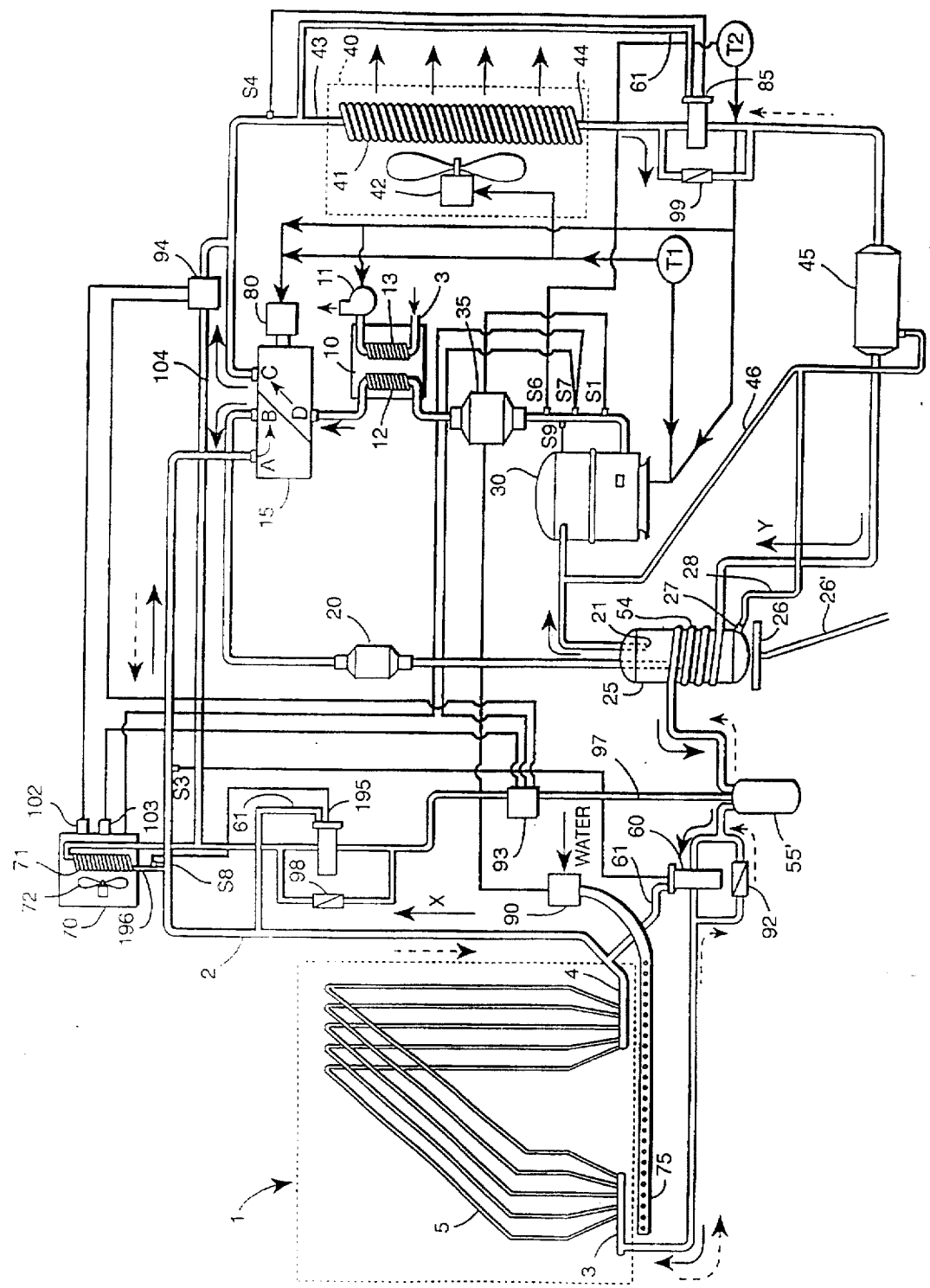
FIG. 9 shows the configuration of a second preferred embodiment of a heating and cooling system according to the present invention, wherein the alternative outdoor fan unit arrangement is incorporated into the first preferred embodiment of the heating and cooling system.

In the above-description, expansion valves 60, 85 and 195 are automatically adjusting valves. However, fixed aperture valves may be suitable for use in some systems. Further, each of the expansion valves preferably has a bypass tube 61, as shown in FIG. 9, to aid in equalizing internal pressure on either side of the respective valves.

We have found that the above-described configuration using an outdoor fan to enhance system performance significantly increases system efficiency. In both the heating mode and the cooling mode, stress on the subterranean heat exchanger 1 is relieved through operation of the outdoor fan 70 using air as a heat exchange medium. Other proposed configurations using an outdoor fan tend to function well, if at all, in only the heating or the cooling mode. Our preferred configuration, which routes only a portion of the refrigerant, say about 50%, through the outdoor fan 70, has exhibited enhanced performance in both the cooling mode and the heating mode.

Figure 8B:
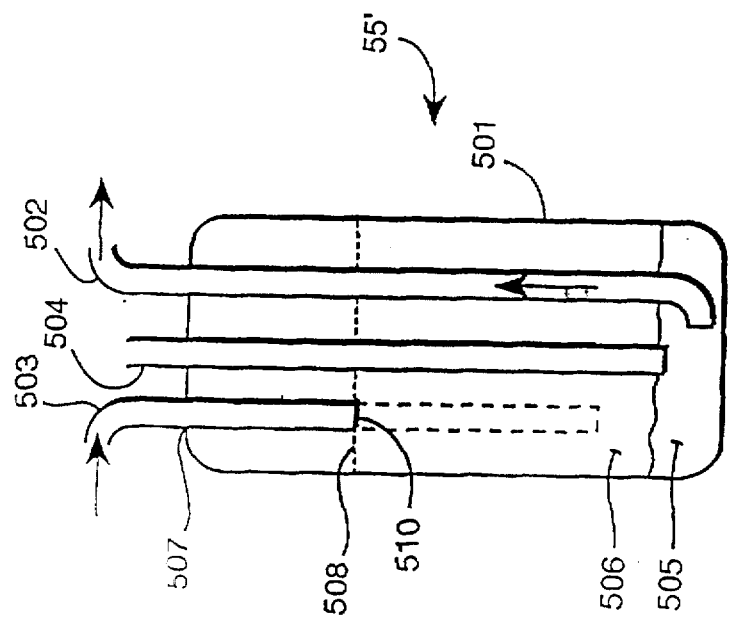
FIGS. 8(a) and 8(b) show a dual direction receiver according to one aspect of the present invention in a heating mode and a cooling mode, respectively.
Figure 8A:
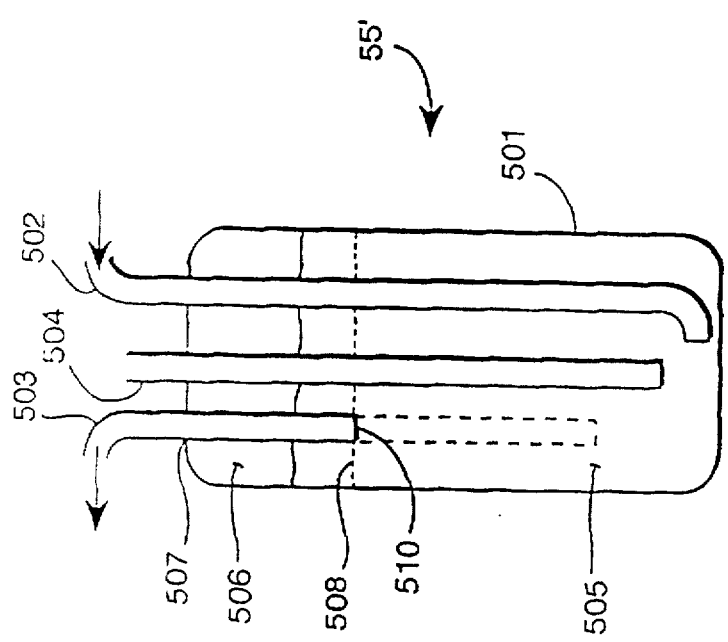

FIGS. 8(a) and 8(b) illustrate an improved structure for the receiver 55' which constitutes another aspect of the present invention. The receiver 55' is preferably made of steel, which provides the necessary strength to withstand internal pressures of about 400 psi that may arise during system operation. FIG. 8(a) depicts the receiver 55' in the heating mode. The receiver 55' comprises a vessel 501, and two tubes 502 and 503. In a preferred embodiment, the vessel 501 has a cylindrical shape with a diameter of about 3 inches and a height of about 28 inches, for example. The tubes 502 and 503 have an outer diameter of, for example, about ½" inch in the preferred embodiment. In the heating mode, as shown in FIG. 8(a), the tube 502 is an inlet tube and the tube 503 is a discharge tube. The receiver 55' further comprises a hot gas line 504 having an inner diameter of, for example, about ⅛" inch. All of the tubes have a wall thickness of about 0.032 inch in the preferred embodiment. The hot gas line 504 provides the means through which refrigerant passes into or out of the receiver 55', in communication with the conduit section 97 discussed above.

In the heating mode, refrigerant coming from the indoor air handler 40 enters the vessel 501 through tube 502. Liquid refrigerant (depicted by reference numeral 505) fills the vessel 501 from the bottom, while vaporous refrigerant (depicted by reference numeral 506) collects at the top of the vessel 501. The bottom end 510 of the tube 503 defines a discharge level 508, at which point the refrigerant enters the tube 503 and exits the vessel. 501. The area above the discharge level 508 serves as a storage area for excess refrigerant, if the system is overcharged.

Conventionally, a receiver of a specific size must be used to match a particular system capacity. This is a drawback, because system manufacturing costs are increased by the need to make or buy several different sizes of receivers, and keep them in inventory. The receiver 55' of the present invention addresses this problem by being a variable capacity receiver. Specifically, the capacity of the receiver 55' can be varied, even if a single size for vessel 501 is used in all manufactured receivers, by positioning the bottom end 510 of tube 503 an appropriate distance From the bottom of vessel 501, i.e., moving the discharge level 508 up or down. The required capacity for the receiver 55' can be calculated for a particular system installation based on factors including the line set size and the distance of the receiver 55' from the subterranean heat exchanger 1. The tube 503 can then be soldered to the vessel 501 at a point 507 to establish a discharge level 508 that is appropriate for the required receiver capacity The receiver 55' of the present invention provides a further improvement in that it is dual directional. FIG. 8(b) shows the receiver 55' in the cooling mode. As shown in that figure, there is much less liquid refrigerant in the receiver 55' than in the heating mode, because more of the refrigerant is needed in circulation through the system to maintain a proper charge level. Since the direction of flow is reversed in the cooling mode, the tube 503 serves as the inlet tube and the tube 502 serves as the discharge tube. By this arrangement, any small amount of oil that has accumulated in the receiver 55' will be sucked off the bottom of the vessel 501, into tube 502, and returned to the compressor 30 through the conduit system 2.

With the above-described configuration, the receiver 55' can handle a wide variation in the volume of circulating refrigerant to effectively control that volume to be at an appropriate level.

FIG. 9 shows a modification of the system shown in FIGS. 1 and 2 in which the embodiment of FIG. 7 is incorporated. Solid arrows indicate the direction of refrigerant flow in the heating mode, and dashed arrows indicate the direction of refrigerant flow in the cooling mode. The reversing valve 15 is shown in the position for the heating mode, and would be positioned as shown in FIG. 2 for the cooling mode. Components like those of FIGS. 1, 2, and 7 are given like reference numerals. Only differences of FIG. 9 from FIGS. 1 and 2 will be discussed.

The configuration of FIG. 9 is different from that in FIGS. 1 and 2 in several respects, due to the use of the dual direction receiver. In FIGS. 1 and 2, the refrigerant passes through the receiver 55 only in the heating mode, and the heating valve 60 and cooling valve 85 are located in separate conduit sections. In contrast, the refrigerant passes through the receiver 55' in both modes in the configuration of FIG. 9. As shown in FIG. 9, receiver 55' carries heat transfer fluid from the gas compressor to said subterranean heat exchanger in the heating mode and from the subterranean heat exchanger to said gas compressor in the cooling mode. The cooling expansion valve 85 and the associated bypass valve 99 are located between the air handler 40 and the oil separator 45. The heating expansion valve 60 and the associated bypass valve 92 are located between the receiver 55' and the subterranean heat exchanger 1. The use of the variable capacity receiver 55' allows for varying volumes of refrigerant and is especially useful in geographic areas where there are wide swings in temperature range, such as the southeast and southwest United States.

The configuration of FIG. 9 also differs from that of FIGS. 1 and 2 in the manner in which outdoor fan 70 is connected to the rest of the system. In FIG. 9, a bypass system is provided so that a portion of the refrigerant can be routed between the receiver 55' and the outdoor fan 70, thereby bypassing its normal flow path. Conduit section 196 connects the outdoor fan 70 to a portion of conduit 2 through which the refrigerant passes as it exits the subterranean heat exchanger 1 in the heating mode. Conduit section 97, which contains solenoid valve 93 and the assembly of expansion valve 195 and bypass valve 98, connects the outdoor fan 70 to the receiver 55'. Finally, conduit section 104, which contains the solenoid valve 94 that is opened during the defrost cycle, connects the conduit 97 at a point between the expansion valve 195 and the outdoor fan 70 with the conduit 2 at a point between the reversing valve 15 and the indoor air handler 40.

The preferred location for the sensor S4, which controls expansion valve 85, is in or on the conduit 2 where refrigerant exits the air handler 40 in the cooling mode. The preferred location for the sensor S3, which controls expansion valve 60, is in or on the conduit 2 between the reversing valve 15 and the point where conduit section 196 joins conduit 2. These locations provide the most accurate readings of the relevant refrigerant conditions to control the respective expansion valves optimally.

The following line sizes are used in the preferred embodiment, where the dimensions given represent an outer diameter and the lines have a wall thickness of about 0.032". From the ground coil to the heating valve, a liquid line of ½' about and a vapor line of about ⅞ are used. From the heating valve to the compressor section, a liquid line of about ⅜' and a vapor line of about ⅞' are used. From the compressor to the air handler, the line sizes differ, depending on the tonnage of system capacity. For a 2-3 ton system, a liquid line of about ⅜' and a vapor line of about ½' are used. For a 3.5-5 ton system, a liquid line of about ½' and a vapor line of about ½' are used.

Figure 10:
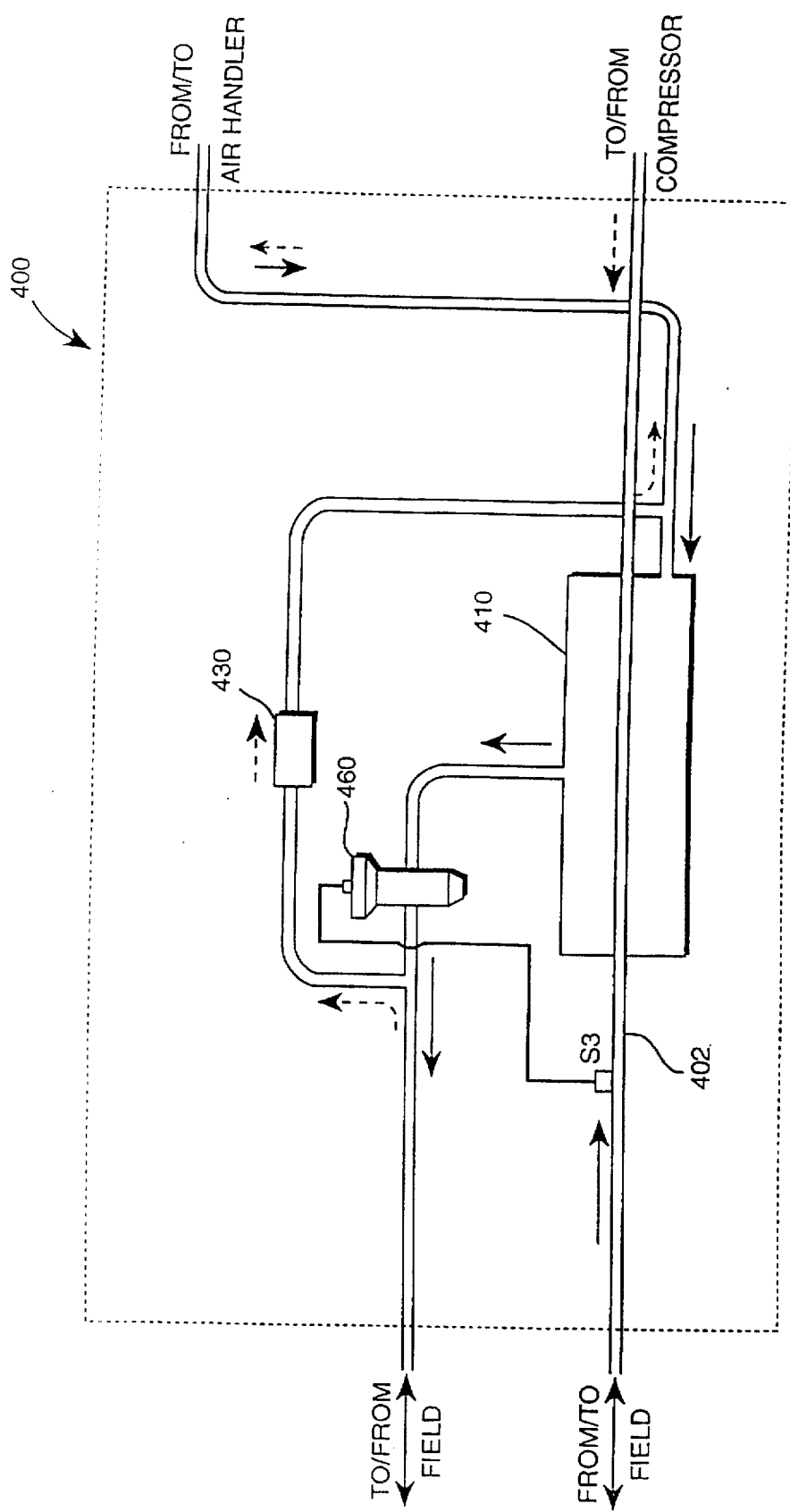
FIG. 10 shows an alternative arrangement for a heating expansion valve according to one aspect of the present invention.

FIG. 10 illustrates another aspect of the present invention. In FIG. 10, block 400 generally designates an alternative arrangement for the heating expansion valve 60 depicted in FIG. 9. The heating valve is designated by reference numeral 460 in FIG. 10. Solid arrows indicate the direction of refrigerant flow in the heating mode, and dashed arrows indicate the direction of refrigerant flow in the cooling mode. A section of conduit 402 that carries refrigerant coming from the field, i.e., subterranean heat exchanger 1, in the heating mode passes through the interior of a vessel 410. That section of conduit then carries the refrigerant on to the compressor. When the refrigerant comes out of the indoor heat exchanger, i.e., the air handler, in the heating mode, it flows through a conduit having a first branch coupled to an inlet port of the vessel 410 and a second branch including a bypass valve 430. The bypass valve 430 blocks the flow of refrigerant through the second branch and forces it to flow through the first branch into the inlet port of the vessel 410. The refrigerant fills the vessel 410 and surrounds the above-described conduit section 402. The refrigerant flows out a discharge port of the vessel 410 and through expansion valve 460 (external cubing 61 is not shown in FIG. 10), which regulates flow based on a sensor S3, which is located so as to accurately measure temperature or pressure of refrigerant coming from the field in the heating mode before it passes through vessel 410. The refrigerant then flows out to the field.

In the cooling mode, the refrigerant coming from the field flows through a bypass valve 430, so it bypasses the vessel 410, and passes to the indoor heat exchanger. When the refrigerant comes from the compressor in the cooling mode, it flows through the conduit section 402 and to the subterranean heat exchanger.

The advantages of this configuration are two-fold. First, the refrigerant filling the vessel 410 is warmer than that coming from the subterranean heat exchanger. The refrigerant returning from the subterranean heat exchanger and flowing to the compressor in the heating mode is therefore heated thereby augmenting the effects of the subterranean heat exchanger and ensuring complete evaporation of the liquid in the returning refrigerant. We have found that this use of indirect heat exchange in the vessel 410 can increase the refrigerant temperature by a significant amount, for example, about eight to ten degrees Fahrenheit. In addition, the refrigerant inside the vessel 410 is cooled by a similar amount before it flows to the expansion valve 460. The refrigerant exiting the expansion valve 460 is therefore at a lower temperature, so that a greater temperature differential exists in the subterranean heat exchanger. As a result, the refrigerant can absorb more heat in the subterranean heat exchanger. Accordingly, this configuration can greatly increase the efficiency of a Geothermal system over that of a system using conventional direct exchange technology, particularly in the heating mode when outdoor temperatures are especially cold. In the preferred embodiment of the invention, the configuration of FIG. 10 is used for the expansion valve 60 in the arrangement of FIG. 9.

Figure 11:
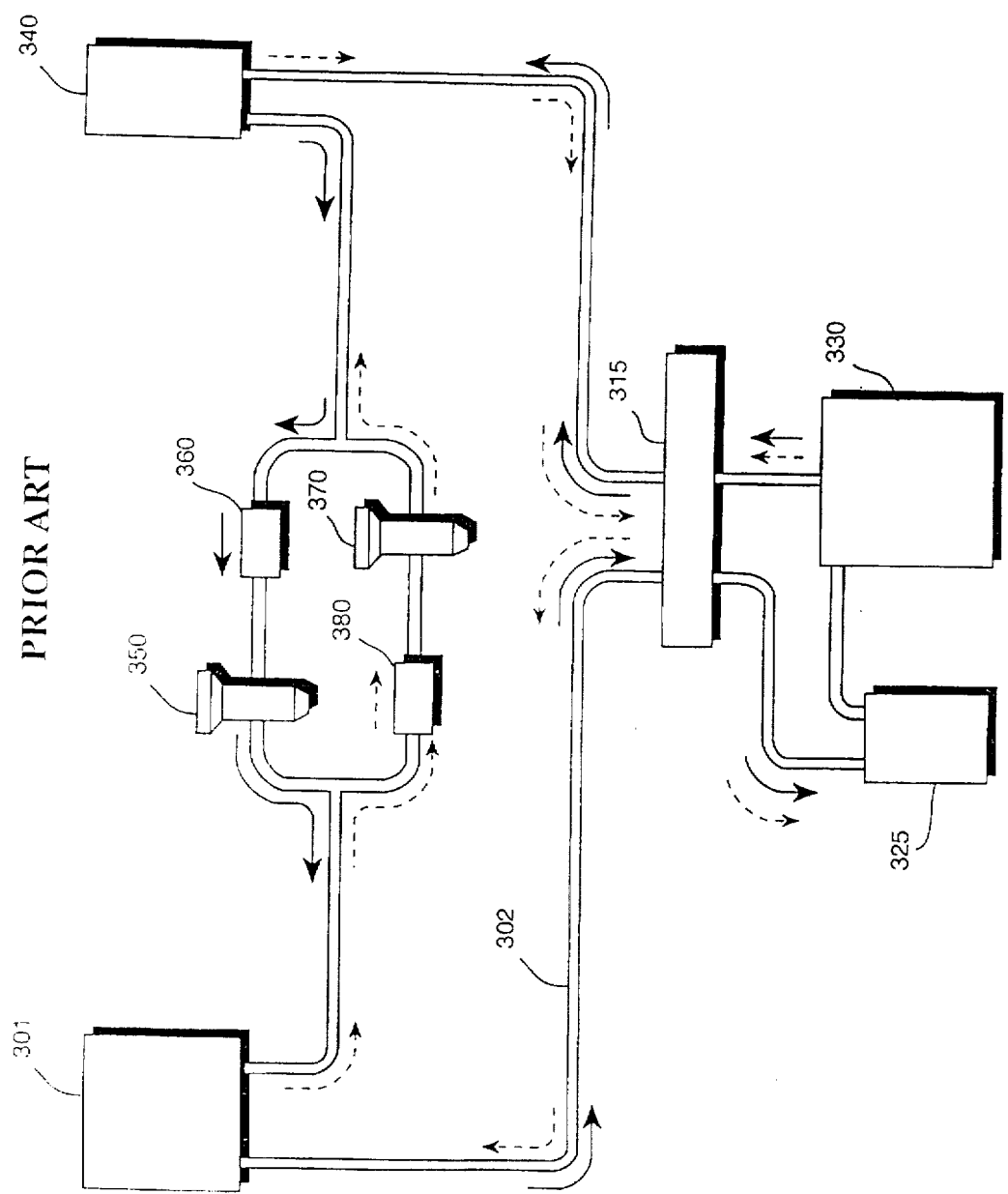
FIG. 11 shows a general configuration for a prior art heating and cooling system.
Figure 12:
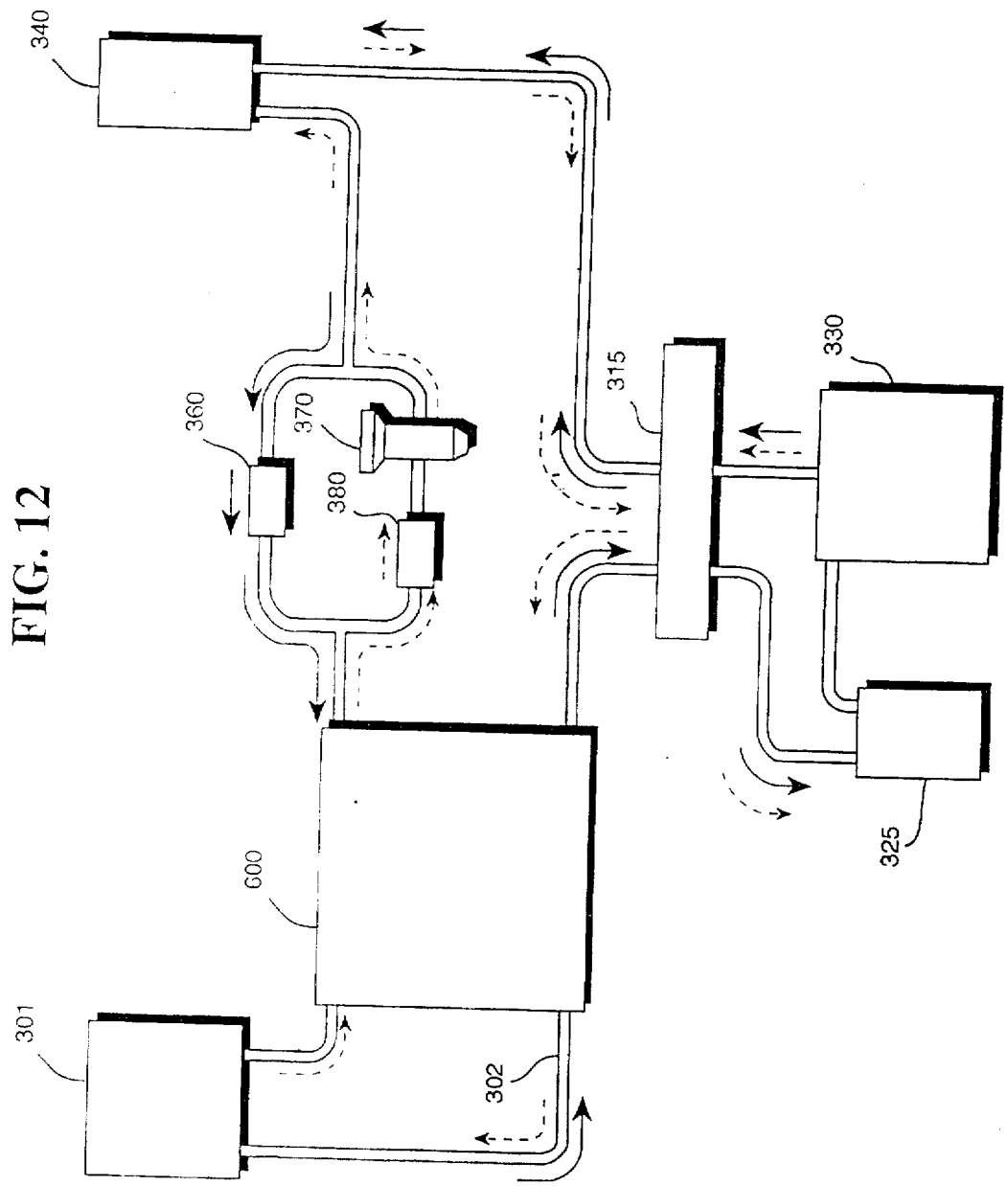
FIG. 12 shows a general configuration for retrofitting a prior art heating and cooling system with a subassembly that constitutes one aspect of the present invention.
Figure 13:
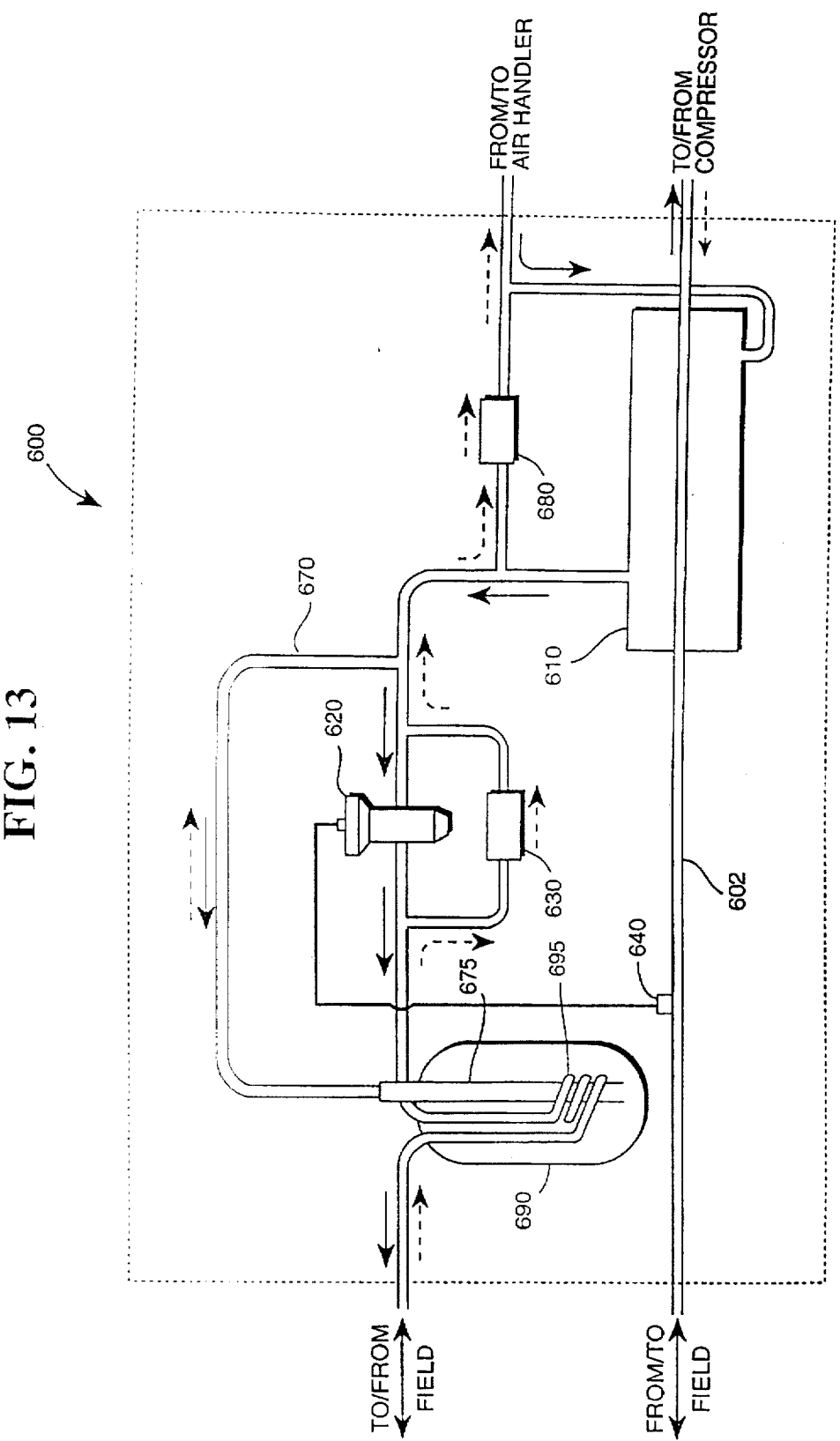
FIG. 13 shows the configuration of a preferred embodiment of a retrofit subassembly according to one aspect of the present invention.

Another aspect of the present invention is described with respect to FIGS. 11 through 13. This arrangement provides a subassembly apparatus suitable for use in retrofitting an existing system in order to improve its efficiency. Incorporation of this retrofit apparatus in a system that currently does not function even at minimally effective levels may permit such a system to operate usefully.

FIG. 11 shows the general configuration of a prior art geothermal heating and cooling system, such as that disclosed in U.S. Pat. No. 5,025,634 to Dressler. The retrofit subassembly apparatus of the present invention is not limited to use with a direct exchange system, but can be used with any internally valved geothermal system. Solid arrows indicate the direction of refrigerant flow in the heating mode, and dashed arrows indicate the direction of refrigerant flow in the cooling mode. In the heating mode, the refrigerant exits an outdoor heat exchanger 301, for example, a subterranean heat exchanger, and travels through a conduit system 302 to a reversing valve 315. The reversing valve 315 routes the refrigerant to an accumulator 325, wherein any liquefied refrigerant is trapped. The gaseous refrigerant then passes to a compressor 330. The refrigerant is compressed to a hot gaseous state and passes back through the reversing valve 315 and to an indoor heat exchanger 340, where heat is given up to warm the indoor air. The refrigerant then passes through a check valve 360 and an expansion valve 350. The refrigerant is cooled as it expands, and then it reenters the outdoor heat exchanger 301, where it absorbs heat and begins the cycle again.

In the cooling mode, the refrigerant exits the outdoor heat exchanger 301 and passes through a check valve 380 and then through an expansion valve 370. The expanded, cooled refrigerant then passes through the indoor heat exchanger 340, where it absorbs heat from the indoor air in order to cool the indoor air. Next, the warmed refrigerant is routed through the reversing valve 315 to the accumulator 325 and then passes through the compressor 330. After passing back through the reversing valve 315, the refrigerant flows into the outdoor heat exchanger 301 again, which acts as a heat sink. This much has been described and used in the prior art.

FIG. 12 illustrates an example of how the retrofit apparatus of the present embodiment of the invention can be used to improve such a prior art system as that shown in FIG. 11. In the prior system having the general configuration shown in FIG. 11, the expansion valves 350 and 370 are typically located near the compressor 330, often as part of a commonly-housed unit. As shown in FIG. 12, the retrofit of the system shown in FIG. 11 is accomplished by removing the heating expansion valve 350 from the prior art system and installing a unit designated by reference numeral 600 at a location that is relatively near to the outdoor heat exchanger, e.g., just inside a building at the point where the conduits to and from the outdoor heat exchanger pass through the wall or floor of the building. The locating of the heating expansion valving near the outdoor heat exchanger 301, rather than near the compressor 330, provides better control over the system pressure in the heating mode and more efficient operation.

FIG. 13 illustrates a preferred configuration for the retrofit subassembly 600. Solid arrows indicate the direction of refrigerant flow in the heating mode, and dashed arrows indicate the direction of refrigerant flow in the cooling mode.

In the heating mode, refrigerant enters from the outdoor heat exchanger through a conduit section 602, which passes through the interior of a vessel 610 and then carries the refrigerant to the compressor. When refrigerant comes from the indoor heat exchanger, i.e., air handler, in the heating mode, it is blocked by a check valve 680 and forced to flow into the vessel 610, from the bottom. The refrigerant fills the vessel 610, surrounding the conduit section 602, and then flows out the top of the vessel 610. The refrigerant then flows through an expansion valve 620, which functions as a flow-control valve and is controlled by a sensor 640, and through a coil 695, which is located inside a receiver 690. In this configuration, the receiver 690 is a storage receiver rather than a dual direction receiver, i.e., refrigerant passes into and out of the receiver 690 through a single path (tube 675, discussed below). After passing through the coil 695, the refrigerant flows out to the outdoor heat exchanger, which acts as a heat source in the heating mode. The indirect heat exchange in vessel 610 provides the same advantages discussed above with respect to the embodiment shown in FIG. 12.

The refrigerant flowing through the coil 695 in the heating mode has been cooled by being passed through the expansion valve 620. Therefore, the interior of the receiver 690 is subcooled. Further, the refrigerant flow is slowed at the expansion valve 620, which limits the volume of refrigerant passing therethrough, so that the refrigerant expands downstream As a result, refrigerant that is not needed for circulation in the heating mode backs up from the expansion valve 620 and is drawn through a conduit section 670 into the subcooled receiver 690. A portion of conduit section 670 that extends down into the receiver 690 is designated as tube 675. The coil 695 is wrapped around the tube 675. By this arrangement, the receiver 690 stores liquid refrigerant that is not needed for circulation in the heating mode.

In the cooling mode, the refrigerant from the outdoor heat exchanger flows through the coil 695, and most of it flows through a bypass conduit including check valve 630, which offers the path of least resistance, so that most of the refrigerant bypasses the expansion valve 620. In the cooling mode, the refrigerant passing through the coil 695 is at a higher temperature than the subcooled liquid refrigerant that was collected and stored in the receiver 690 in the heating mode. Since the coil 695 is wrapped around the lower portion of tube 675, and since the lower end of tube 675 extends down into any liquid refrigerant in the receiver 690, liquid refrigerant at the bottom of tube 675 will be heated and turned to a gaseous state. The gas will pass through the tube 675 and the conduit section 670, and will begin to circulate through the system again. Additional liquid refrigerant in the receiver 690 will be drawn into the space at the bottom of the tube 675 and will also be heated.

The refrigerant passing either through the check valve 630 or out of the receiver 690 through the conduit section 670 passes through a check valve 680 and on to the indoor heat exchanger. The refrigerant passes through the check valve 680 instead of the vessel 610 because the vessel 610 is filled with hot gas, so that the path through the check valve 680 offers the least resistance to the pressurized refrigerant.

When the refrigerant comes from the compressor in the cooling mode, it passes through the conduit section 602 and back to the outdoor heat exchanger, which acts as a heat sink. By the configuration of this embodiment, the amount of refrigerant circulating through the system is automatically regulated, and any excess refrigerant is stored in the receiver 690.

As will be understood from the above description, each of the various components described enhances the efficiency and flexibility of a conventional geothermal heat pump system in a characteristic manner. All of the described features are not necessarily required in every configuration of the system. In addition, the temperatures and pressures at which certain components turn on or off may be varied, although the parameters of the preferred embodiment are believed to be appropriate for most applications.

Accordingly, the system may be configured to achieve an optimally efficient system for a particular region based on numerous factors. Those factors include the soil type, soil moisture and temperature conditions, the cost of other energy used to heat water or operate fans, the space available for installing a subterranean heat exchanger, etc. For example, if concrete or a particulate solid cannot be used to embed the conduit of a subterranean heat exchanger, then some combination of an oversized field, an automatically operating soaker conduit, a performance enhancing outdoor fan, a temperature and pressure sensitive heating valve, a receiver, a heated accumulator, etc., may be used to compensate for variations in soil conditions.

There are therefore at least two possible consequences of incorporating one or more aspects of the present invention into a geothermal heat pump system: (1) the coefficient of performance (COP) or energy efficiency rating (EER) of a functioning heat pump system can be significantly increased, and (2) a heat pump system can be constructed that will work well in regions where prior heat pump systems cannot function well.

The components shown in block diagram are all well known to those skilled in the art of heating and cooling systems, and the details thereof are not critical to an understanding of the present invention.

Although the presently preferred embodiments have been described above in detail, the present invention is not limited to the disclosed embodiments. The following claims should be broadly construed to encompass all variations of the disclosed embodiments that fall within the spirit and scope of the present invention.

We claim:

1. In a heating and cooling system having a subterranean heat exchanger in thermal communication with the earth, a dynamic load heat exchanger in thermal communication with a dynamic load, a conduit circuit for circulating a phase-change heat transfer fluid so as to convey thermal energy from one said heat exchanger to the other, a gas compressor in said conduit circuit for compressing said heat transfer fluid while in the gas phase, an expansion valve in a section of said conduit circuit that carries the heat transfer fluid from said dynamic load heat exchanger to said subterranean heat exchanger when the system is being operated in the heating mode [or the cooling mode], and a trap vessel in said conduit circuit for trapping any liquid present in the heat transfer fluid that is about to be sucked into the compressor, the improvement wherein said system includes a reservoir vessel in said conduit circuit for holding a reserve supply of said heat transfer fluid in liquid phase, the reservoir vessel being located in said section of the conduit circuit that carries heat transfer fluid from said gas compressor to said subterranean heat exchanger in the heating mode and from the subterranean heat exchanger to said gas compressor in the cooling mode, at a location between said gas compressor and said expansion valve.

2. The system of claim 1, further comprising a tube coupled between the expansion valve and a section of the conduit circuit adjacent to the subterranean heat exchanger for pressure equalization.

3. The system of claim 1, wherein said expansion valve is coupled through a by-pass line to a section of the conduit circuit to equalize pressure and is without an internal bleed port.

4. The system of claim 1 further comprising an oil separator and means for transferring oil received with the heat transfer fluid from the conduit circuit by the reservoir vessel from the reservoir vessel to the oil separator.

5. The system of claim 1 further comprising means for transferring oil received with the heat transfer fluid from the conduit circuit by the reservoir vessel from the reservoir vessel to the gas compressor.

6. The system of claim 1 wherein the subterranean heat exchanger comprises first and second heat transfer fluid distributors for transferring the heat transfer fluid between the conduit circuit and the subterranean heat exchanger, and an insulating divider between the first and second heat transfer fluid distributors.

7. In a heating and cooling system having a subterranean heat exchanger in thermal communication with the earth, a dynamic load heat exchanger in thermal communication with a dynamic load, a conduit circuit for circulating a phase-change heat transfer fluid so as to convey thermal energy from one said heat exchanger to the other, a gas compressor in said conduit circuit for compressing said heat transfer fluid while in the gas phase, an expansion valve in a section of said conduit circuit that carries the heat transfer fluid from said dynamic load heat exchanger to said subterranean heat exchanger when the system is being operated in the heating mode, a trap vessel in said conduit circuit for trapping any liquid present in the heat transfer fluid that is about to be sucked into the compressor, and a receiver in said conduit circuit, the improvement wherein said receiver is a variable-capacity, dual direction receiver comprising:
a vessel having a bottom, a side wall, and a top;
a first tube having an end that extends through the top of said vessel to a position adjacent to the bottom of said vessel;
a second tube having an end that extends through the top of said vessel to a position that may be selected to be a desired distance from the bottom of said vessel; and
a third tube having an end that extends through the top of said vessel to a position intermediate the position of the end of the first tube and the position of the end of the second tube for carrying heat transfer fluid to the vessel during a cooling mode.

8. A variable-capacity, dual direction receiver according to claim 7, wherein the third tube carries the heat transfer fluid from the vessel during a heating mode.

9. A subassembly for a heating and cooling system, said subassembly comprising:
a receiver;
a first heat transfer fluid conduit passing through said receiver;
a flow-control valve located in said first heat transfer fluid conduit at a position external to said receiver;
a bypass conduit comprising a second heat transfer fluid conduit having two ends, each end being connected to said first heat transfer fluid conduit at a different side of said flow-control valve, and a check valve located in said second heat transfer fluid conduit; and
a third heat transfer fluid conduit having two ends, one end being connected to said first heat transfer fluid conduit at a connection point located at a side of said flow-control valve opposite said receiver, and the other end being located inside said receiver.

10. The system of claim 9 wherein the section of said first heat transfer fluid conduit located inside said receiver is coiled.

11. The system of claim 9 wherein said subassembly further comprises:
a vessel having an inlet port and a discharge port, said discharge port being connected to an end of said first heat transfer fluid conduit that is on an opposite side of said flow-control valve from said receiver;
a fourth heat transfer fluid conduit connected to both the inlet port and the discharge port of said vessel;
another check valve located in said fourth heat transfer fluid conduit; and
a fifth heat transfer fluid conduit passing through the interior of said vessel.

* * * * *